United States Patent [19]
Chui et al.

[11] Patent Number: 5,949,911
[45] Date of Patent: Sep. 7, 1999

[54] SYSTEM AND METHOD FOR SCALABLE CODING OF SPARSE DATA SETS

[75] Inventors: Charles K. Chui; Lefan Zhong, both of Palo Alto; Rongxiang Yi, Sunnyvale, all of Calif.

[73] Assignee: TeraLogic, Inc., Mountain View, Calif.

[21] Appl. No.: 08/858,035

[22] Filed: May 16, 1997

[51] Int. Cl.$^6$ .............................. G06K 9/36; H04N 7/12; H03M 7/00

[52] U.S. Cl. .......................... 382/240; 382/232; 348/398; 341/79

[58] Field of Search ................................... 382/240, 232, 382/233, 226, 246, 248, 239; 341/79; 348/398

[56] References Cited

U.S. PATENT DOCUMENTS

| | | | |
|---|---|---|---|
| 5,412,741 | 5/1995 | Shapiro | 382/232 |
| 5,740,277 | 4/1998 | Katto | 382/232 |
| 5,745,607 | 4/1998 | Maeda | 382/240 |
| 5,748,786 | 5/1998 | Zandi et al. | 382/240 |
| 5,764,807 | 6/1998 | Pearlman et al. | 382/240 |

OTHER PUBLICATIONS

"Wavelet Transform and Bit–Plane Encoding," Cai et al. IEEE Comput. Soc. Press, 1995, pp. 578–581.

Cai, H., et al., "Wavelet Transform and Bit–Plane Encoding", Proceedings International Conference on Image Processing, IEEE Compt. Soc. Press, 1955, vol. 1, pp. 578–581.

Said, A., et al., "A New, Fast, and Efficient Image Codec Based on Set Partitioning in Hierarchical Trees", IEEE Transactions on Circuits and Systems for Video Technology, Jun. 1996, vol. 6, No. 3, pp. 243–250.

*Primary Examiner*—Thomas D. Lee
*Assistant Examiner*—Wenpeng Chen
*Attorney, Agent, or Firm*—Gary S. Williams; Pennie & Edmonds LLP

[57] ABSTRACT

A data encoding system and method successively generates compressed data on a bit plane by bit plane basis, starting with the bit position of the most significant non-zero bit for the node in the data array having the largest absolute value, and then encoding the data in the array for progressively less significant bits. All the nodes in the data array are represented initially by blocks of nodes on a block list, and later in the processing by nodes on two node lists. Whenever a block contains a node whose most significant bit is on the bit plane currently being processed, the block will be subdivided recursively until all the nodes in the block whose most significant bit in on the current bit plane are placed in a node list. Data bits representing an $m^{th}$ least significant bit of the block and node values are written to the compressed data file first, where m is the minimum number of bits required to represent the node having the largest absolute value in the entire data array being encoded. Data bits for successively less significant bit planes are written to the compressed data file until a bit plane stop point is reached. The bit plane stop point may be predefined, user selected, or procedurally selected (e.g., in accordance with available bandwidth for transmitting compressed image data).

30 Claims, 15 Drawing Sheets

SYSTEM AND METHOD FOR SCALABLE CODING OF SPARSE DATA SETS

The present invention relates generally to systems and methods for lossless (or not-lossless) compression and reconstruction of data, such as the quantized wavelet coefficients of a wavelet transformed image, that is sparsely populated by non-zero data, and particularly to a system and method for efficiently identifying and encoding portions of a data set occupied by zero and near-zero values.

BACKGROUND OF THE INVENTION

Sparsely populated data sets are utilized in numerous technical fields. The present invention was developed for efficiently encoding image data that has been transformed by successive applications of wavelet transforms, but is equally applicable to other types of sparsely populated data sets. Image data that has been transformed by successive applications of wavelet transforms tends to have large portions occupied by zero and near-zero values, especially if the data is subjected to a data quantization step prior to encoding.

The primary goals of the present invention are to provide an encoding methodology that (A) efficiently locates subarrays that are entirely occupied by zero and near-zero data and encoding such subarrays with as few data bits as possible, (B) determines the maximum number of data bits required to encode subarrays that include at least some non-zero data, and (C) encodes non-zero data with the minimum number of data bits required to losslessly store such data.

Another goal of the present invention is to provide a mechanism for selectively or controllably reducing the size of a compressed data file while losing as little information as possible.

Other goals of the present invention are to provide an encoding methodology that is computationally very efficient, and one that is suitable for implementation in part or completely in hardware (i.e., electronic circuitry).

Yet another goal is to provide an encoding and decoding methodology that facilitates "on-the-fly" decoding and partial image reconstruction while an array of encoded, compressed data is still being received, enabling users to view a partially reconstructed image before the receiving system has finished receiving the encoded, compressed data.

SUMMARY OF THE INVENTION

In summary, the present invention is a system and method for encoding an array of data. The data encoding method successively generates compressed data on a bit plane by bit plane basis, starting with the bit position of the most significant non-zero bit for the node in the data array having the largest absolute value, and then encoding the data in the array for progressively less significant bits. All the nodes in the data array are represented initially by blocks of nodes on a block list, and later in the processing by nodes on two node lists. The two node lists are a small valued node list LSN and a large valued node list LLN.

Whenever, for the current bit plane being encoded, a block on the block list is found to have at least one node whose most significant bit is on the current bit plane, if the size of the data block is greater than a predefined minimum block size (e.g., 2×2), the block is divided into smaller data blocks and those smaller data blocks are put on the list of blocks for further processing. If the size of a data block that is being processed is the predefined minimum block size, the nodes in the block are put on one of two node lists, depending on the magnitude of the data value at each node.

Whenever a block contains a node whose most significant bit is on the bit plane currently being processed, the block will be subdivided recursively until all the nodes in the block whose most significant bit in on the current bit plane are placed in the LLN list. Other nodes that happen to be in the same minimum size blocks as the nodes put on the LLN list are placed on the LSN list. All subblocks formed during the division of a block that contain no nodes whose most significant bit is on the current bit plane are left on the list of blocks.

Data representing the value of the node having the largest absolute value in each block, and data representing the value of the nodes in the two node lists are output to a compressed data file one bit plane at a time. Data bits representing the mth least significant bit of the block and node values are written to the compressed data file first, where m is the minimum number of bits required to represent the node having the largest absolute value in the entire data array being encoded. Data bits for successively less significant bit planes are written to the compressed data file until a bit plane stop point is reached. The bit plane stop point may be predefined, user selected, or procedurally selected (e.g., in accordance with available bandwidth for transmitting compressed image data).

Within the compressed data for each bit plane, data bits are written into the compressed data file in the same order that the blocks and nodes are listed in the block and node lists.

The encoded data is highly compressed primarily because when the Z most significant bits of all the nodes in a Y×Y block of data are equal to zero (e.g., when the block contains mostly zero and near-zero data), those Z most significant bits are represented in the encoded by just Z bits, instead of Z×Y² bits. Furthermore, blocks are subdivided into smaller blocks or nodes only when required for the encoding of non-zero data bits of particular nodes. In effect, the compressed data includes a sequence of bits for each block (albeit widely distributed throughout the compressed data file) that indicates the maximum number of data bits required to encode the node of largest absolute value in each such block.

The data decoding method retraces the encoded data so as to reverse the process performed by the encoding method. The data decoding method reconstructs data blocks and node values one bit plane at a time. The bits of the encoded data are read, in order, in a single pass from the first bit to the last. When the last data bit in the encoded data has been processed, reconstruction of the encoded data array is complete. As the encoded data is read, entries are added to a block list to identify data blocks that will be processed later, and to two node lists to identify nodes that will processed later.

In some embodiments, the two node lists can be combined into a single data structure, with each entry marked to indicate the list (LSN or LLN) to which it belongs, so as reduce the memory requirements of the encoder and decoder.

In yet other embodiments, the nodes lists can be eliminated entirely, thereby saving even more memory in the encoder and decoder. Instead, minimum size blocks on the block list are not deleted from that list when they are divided into four nodes. Rather, the block is marked on the list as having been divided (by using a unique block size value, such as 0), and each block on the block list that is marked is treated as an implied list of four nodes.

In a preferred embodiment, an "on-the-fly" partial image reconstruction procedure can be enabled to generate and regenerate a partially reconstructed image while the compressed data for an image is still being received, using whatever portion of the encoded, compressed data has been received and decoded at each of a set of predefined junctures.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
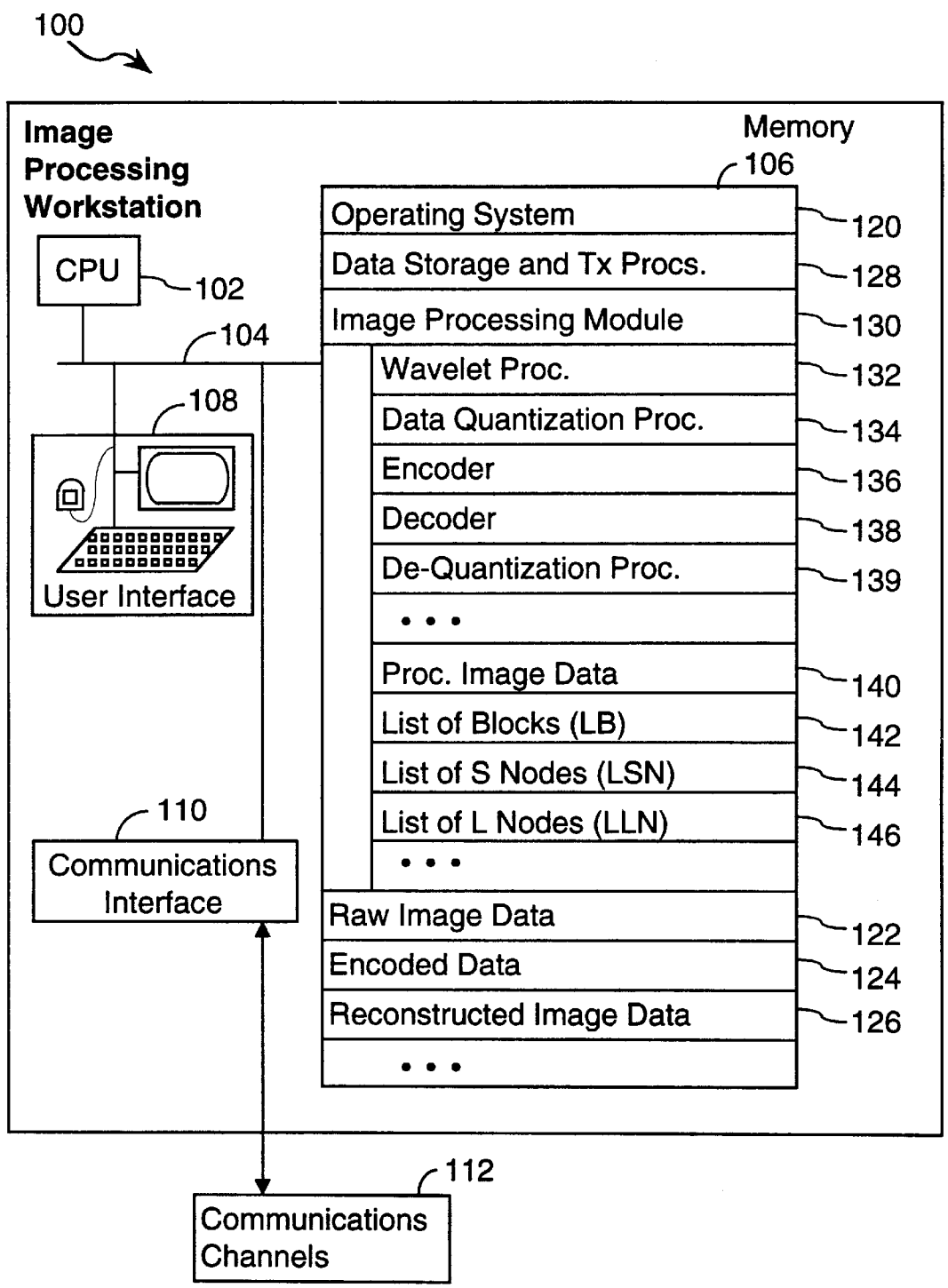
FIG. 1 is a block diagram of an image processing workstation incorporating a first preferred embodiment of the present invention.

Referring to FIG. 1, there is shown a computer system or workstation 100 that incorporates a first preferred embodiment of the present invention. The system 100 includes a central processing unit 102, internal system, control and data busses 104, memory 106 (including random access memory as well as non-volatile memory such as magnetic disk storage), a user interface 108, and a communications interface 110 for transferring information to and from other devices via one or more communication channels 112.

Memory 106 stores both computer software and data, including:
an operating system 120;
raw image data 122, such as image data files generated by a digital camera, CAT scan device, MR imaging system, or an image scanner;
encoded data 124, such as compressed image data files generated by a data encoder or data encoding procedure;
reconstructed image data 126, such as reconstructed image data files generated by a data decoder and wavelet data reconstruction procedure; and
procedures 128 for managing the storage, transmission and receipt of data files;
an image processing module 130 for processing image data.

In a first preferred embodiment, the image processing module 130 includes:
a wavelet procedure 132 for transforming arrays of data using wavelet transforms into wavelet analyzed data, and vice versa;
a data quantization procedure 134 for quantizing the wavelet analyzed data (also known as wavelet coefficients) produced by the wavelet procedure 132;
an encoder procedure 136 for encoding an array of data;
a decoder procedure 138 for decoding a set of encoded data into a corresponding reconstructed data array;
a data de-quantization procedure 139 for remapping quantized wavelet coefficients back into wavelet coefficients;
processed image data files or storage arrays 140 for temporarily storing wavelet analyzed data or decoded data; and
a block list and two node list data structures 142, 144, 146 for storing data utilized by the encoder and decoder procedures 136, 138.

As indicated above, the present invention is suitable for use with any sparsely populated data set. For the purposes of explaining the operation of the encoder and decoder procedures, the specific type of wavelet transform procedure 132 used and the specific type of data quantization procedure 134 used to transform an image file into a processed image data file are not relevant and therefore are not further described herein. However, a preferred embodiment of the wavelet transform procedure 132 and the data quantization procedure 134 are described in U.S. patent application Ser. No. 08/758,224, filed Nov. 27, 1996, "System and Method for Performing Wavelet and Inverse Wavelet Like Transformations of Digital Data Using Only Add and Bit Shift Arithmetic Operations," which is hereby incorporated by reference as background information.

Figure 2:
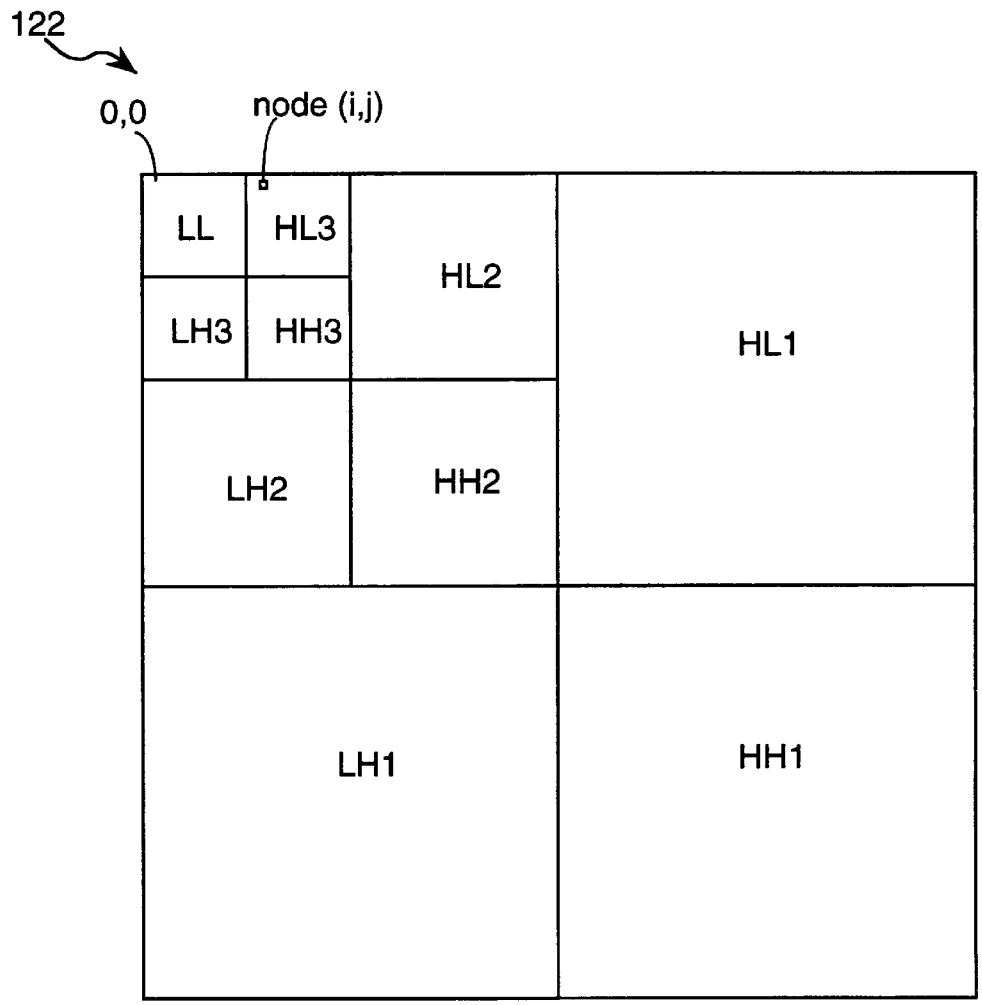
FIG. 2 schematically represents an image data array.

Referring to FIG. 2, there is shown a two dimensional array 122 of coefficients generated by successive applications of a wavelet decomposition transform. A first application of the wavelet decomposition transform to an initial two dimensional array of data generates four sets of coefficients, labeled LL, HL1, LH1 and HH1. Each succeeding application of the wavelet decomposition transform is applied only to the LL set of coefficients generated by the previous wavelet transformation step and generates four new sets of coefficients, labeled LL, HLx, LHx and HHx, where x represents the wavelet transform "layer" or iteration. After the last wavelet decomposition transform iteration only one LL set remains. The total number of coefficients generated is equal to the number of data samples in the original data array. The different sets of coefficients generated by each transform iteration are sometimes called layers.

While the present application is also applicable to the encoding of sparse data arrays not generated by wavelet decomposition, the structure of the data array produced by wavelet decomposition is well suited for a data compression procedure that is optimized for efficiently encoding blocks of data having values of similar magnitude. In particular, the wavelet coefficients in HHx, HLx and LHx portions of the data array tend to be dominated by zero and near-zero values.

Figure 3A:
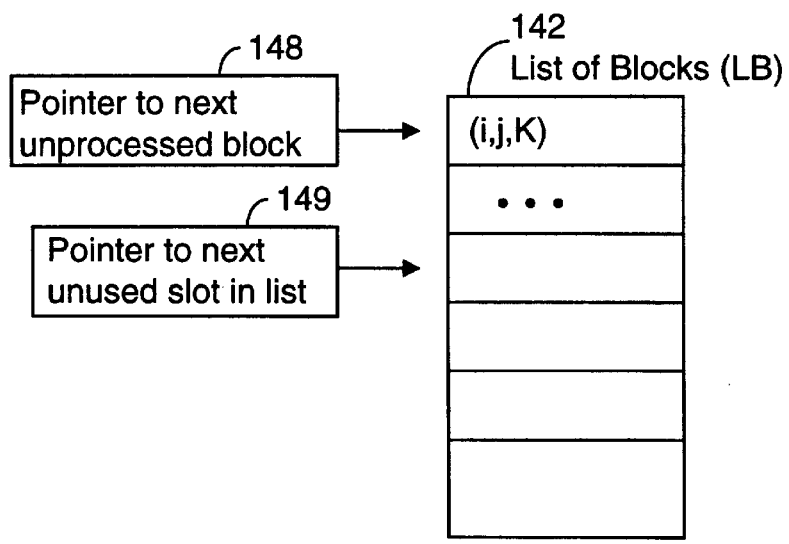
FIGS. 3A, 3B and 3C depict a block list and two node list data structures used by the data encoder and data decoder in a preferred embodiment.
Figure 3B:
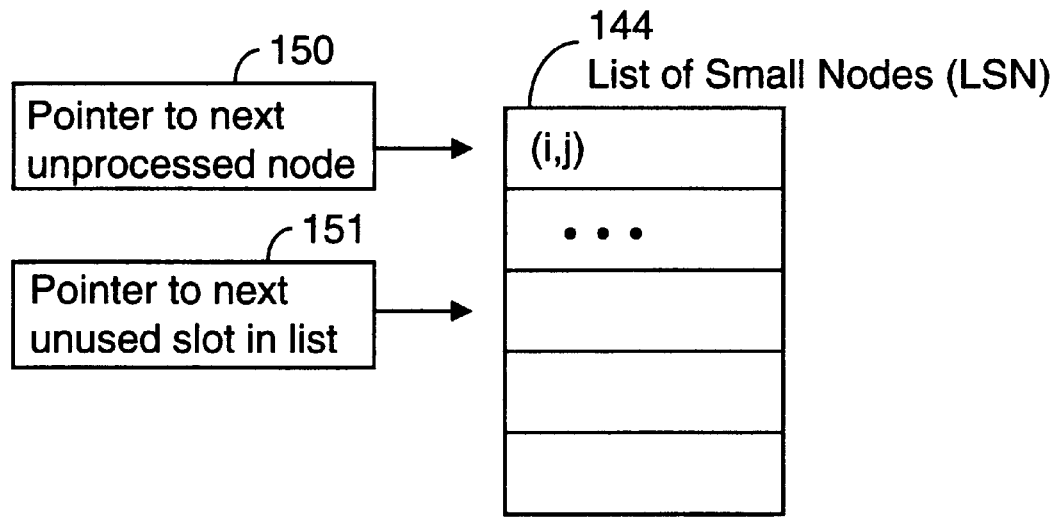
Figure 3C:
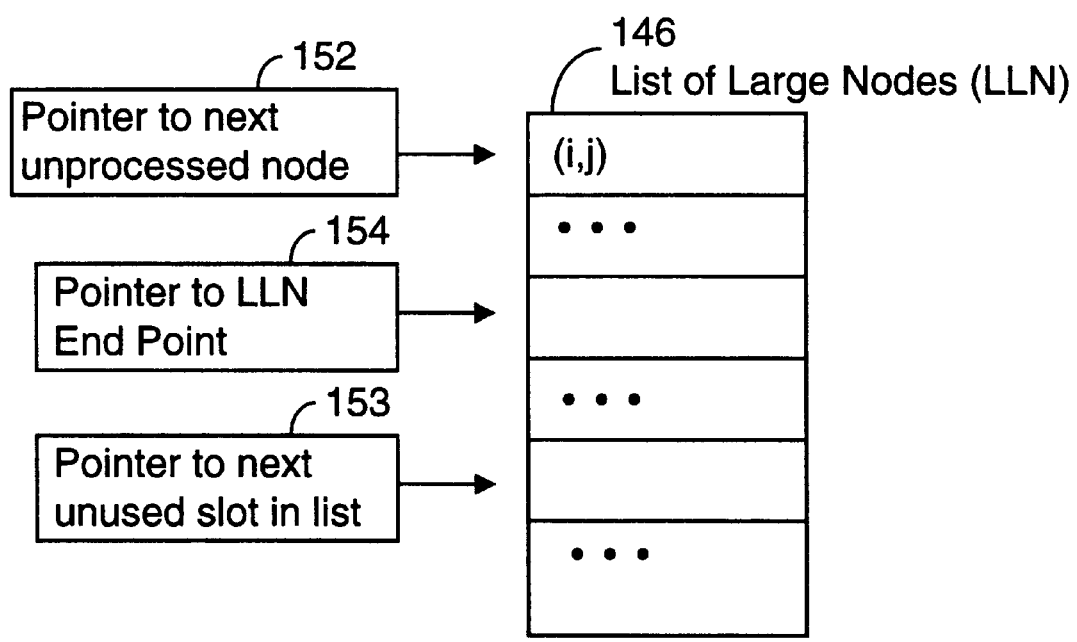

Referring to FIGS. 3A, 3B and 3C, the main "bookkeeping" data structures used by the encoder and decoder procedures are shown. In particular, a block list data structure (LB) 142 lists blocks (i.e., subarrays of data) being analyzed, a first node list (LSN) 144 lists "small" nodes (i.e., nodes having small values relative to a current threshold value), and a second node list (LLN) 146 lists "large" nodes (i.e., nodes having large values relative to a current threshold value).

The block list LB 142 stores two items for each data block: a block identifier consisting of two values (i,j) indicating the origin of the data block, and a value (k) indicating the height and width of the data block. In one preferred embodiment, blocks always have height and width both equal to a number of data nodes that is an integer power of 2, $2^k$. Each of the node lists, LSN 144 and LLN 146, stores the coordinates of each node represented in those lists.

The block list LB 142 has a pointer 148 to the next unprocessed block in the list (i.e., the highest block in the list not yet processed for the current bit level) and a pointer 149 to the next unused slot in the list. The small nodes list LSN 144 has a pointer 150 to next unprocessed node in the list and a pointer 151 to the next unused slot in the list. The large nodes list LLN 146 has a pointer 152 to next unprocessed node in the list, a pointer 153 to the next unused slot in the list, and an end point pointer 154 for indicating where in the list to stop processing nodes.

Encoder Procedure

Figure 4:
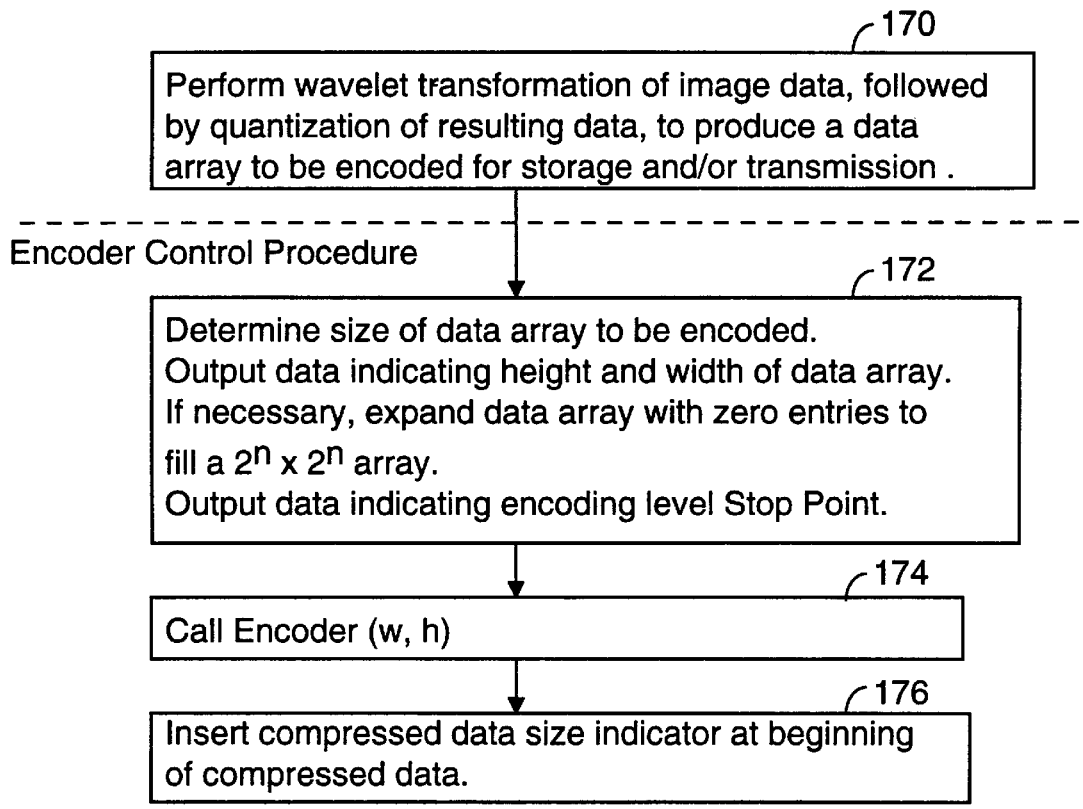
FIGS. 4 and 5 are flow charts of a preferred embodiment of the data encoding method and data decoding method used in the present invention, respectively.

Referring to FIG. 4, prior to execution of the encoder procedure 136, one or more data preparation procedures will typically be performed (step 170). In the preferred embodiments, data preparation consists of performing a wavelet transformation (using wavelet procedure 132) of an image data array, followed by quantization (using data quantization procedure 134) of the resulting data to a predefined set of discrete data values. The wavelet transformation and quantization data preparation steps typically generate a data array sparsely populated with non-zero data. However, the encoder procedure is suitable for encoding virtually any data array, including three-dimensional and N-dimensional data arrays.

The encoder procedure 136 iterates on successive "bit levels" or "bit planes" of the data array, first processing the most significant bit of the data nodes having the largest absolute value, and successively processing less significant bits of the node values. The encoder procedure automatically stops when the number of remaining least significant data bits is equal to a specified Stop Point.

For each bit level, data blocks in the data array are analyzed in the order they appear in the list of blocks 142. Whenever a data block is processed, if the data block is determined to contain no nodes where the mth least significant bit of the node's absolute value is equal to 1, that fact is indicated by writing a 0 bit to the compressed data file, and no further processing of the data block is required. Otherwise, a 1 bit is written to the compressed data file and the data block is subdivided. In particular, if the size of the data block is greater than 2×2, the data block is divided into four smaller subblocks and those four smaller subblocks are put on the list of blocks for further processing. If the size of a data block that is being processed is 2×2, each node in the data block is pushed onto one of two node lists, depending on whether or not the $m^{th}$ least significant bit of the node's absolute value is equal to 1.

For each bit level, all the nodes on the two node lists are processed by outputting bit values indicative of the values of the nodes in those two lists.

More specifically, the encoder procedure begins by determining the height and width of the specified data array to be encoded and outputting those values to the output file (step 172). If the height and width of the data array are not both equal to $2^n \times 2^n$ for some integer n, the data array is expanded with zero-valued (null) entries so that the data array being encoded is a $2^n \times 2^n$ array. Also in step 172, an encoding level Stop Point is output to the compressed data file, where the Stop Point may be predetermined by the encoder, user selected, or determined in some other manner such as by an image quality analysis procedure. At step 174 the main encoder procedure is called.

After the main encoder procedure generates a set of compressed data, an indicator of the amount of compressed data (e.g., measured in bytes or words or predetermined size, such as 32-bit or 64-bit words), is inserted at the beginning of the compressed data file (step 176). During delivery of the compressed data to a receiving system, the compressed data file size indicator can be used by the receiving system to determine what percentage of the compressed data it has received so far, and how long it is likely to take to receive the entire compressed data file.

The decoder procedure, shown in FIG. 5, reverses the steps of the encoder procedure, and will be described in more detail below in the section of this document entitled "Decoder Procedure."

Table 1 provides definitions of terms and abbreviations used in the flow chart figures.

TABLE 1

Definitions of Terms used in Flow Chart Figures

| | |
|---|---|
| node | a single particular position in a data array |
| (w,h,k) | this represents a data block whose origin is at x,y = (w,h) and that extends vertically and horizontally $2^k$ positions. |
| V(w,h,k) | Maximum absolute value of all nodes in the (w,h,k) block |
| LB | List of blocks data structure |
| LSN | List of small valued nodes |
| LLN | List of large valued nodes |
| V(i,j) | the value of the (i,j) node |
| sgn(i,j) | the sign of the data value at the (i,j) node |
| Bit(w,h,k) | the maximum number of bits required to encode the absolute value of any data value in the block (i.e., int($\log_2 V$) + 1, where "int( )" represents the integer portion of a specified value) |
| (w,h,k)'s subblocks | (w,h,k − 1), (w,h + $2^{k-1}$,k − 1), (w + $2^{k-1}$,h,k − 1), (w + $2^{k-1}$,h + $2^{k-1}$,k − 1) |
| nodes of (w,h,1) | (w,h), (w,h + 1), (w + 1,h) (w + 1,h + 1) |

Figure 6:
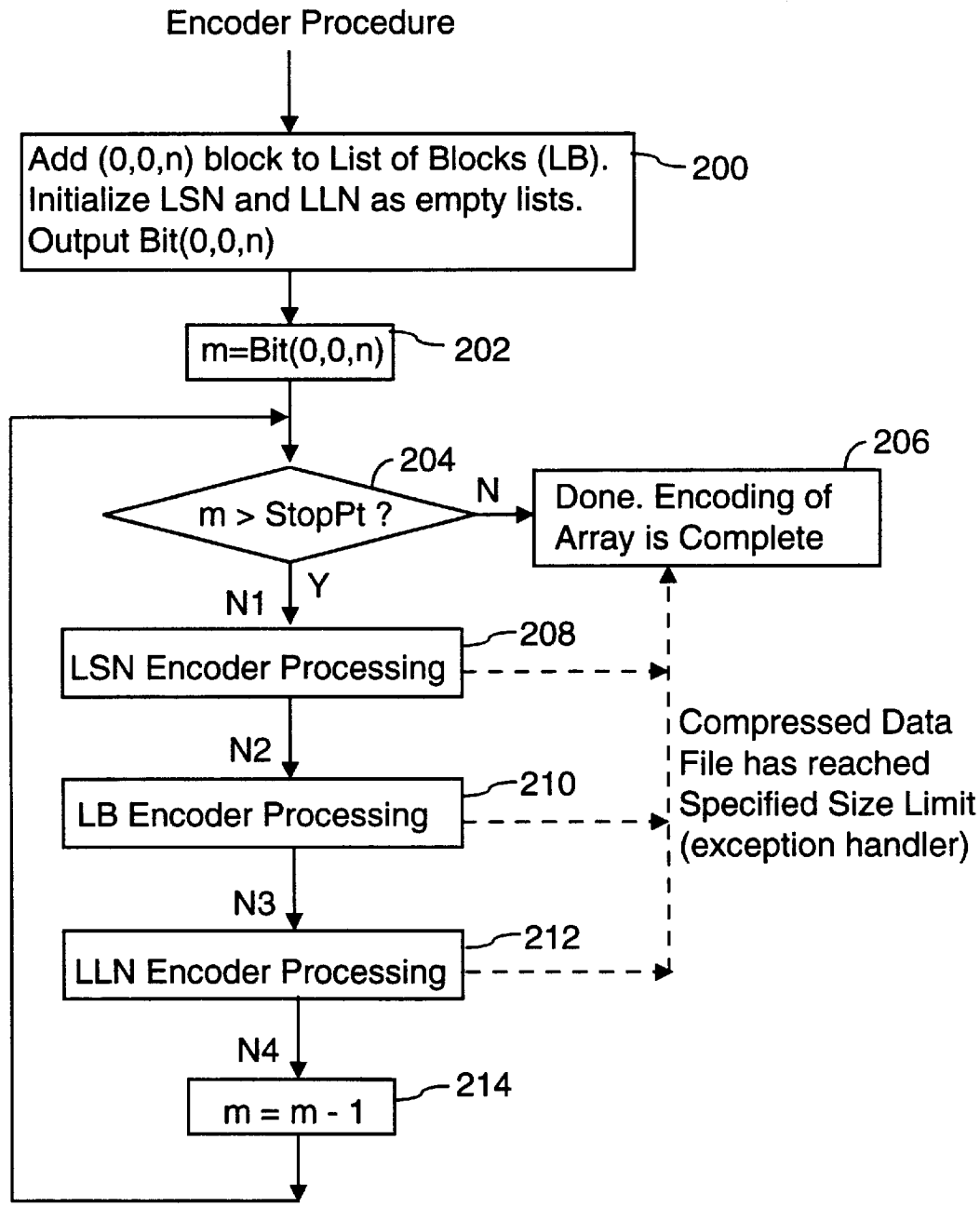
FIGS. 6, 7, 8, 9 and 10 are flow charts of a preferred embodiment of the data encoding method of the present invention.

Referring to FIG. 6, the procedure for encoding an array of $2^n \times 2^n$ data values begins by putting a first entry, representing the entire $2^n \times 2^n$ analysis array, in the list of blocks (step 200). The list of blocks is empty except for this first entry. Also, at step 200 the encoder procedure determines the value of Bit(0,0,n), which is equal to the maximum number of bits required to encode any data value in the entire array being analyzed, and outputs that value using a predefined number of bits (e.g., 4 bits).

The bit level control variable "m" is set equal to Bit(0,0,n) so that m initially indicates the most significant non-zero bit of any node in the data array. If Bit(0,0,n) is equal to zero (step 204), that indicates that all the nodes in the array to be encoded are equal to zero, and therefore the encoding procedure is complete (step 206).

More generally, if the current bit level, m, is greater than the designated Stop Point (step 204) (StopPt in the figures), that indicates that further encoding of the data array is required. If m is not greater than the Stop Point, this indicates that encoding of the data array has been completed (step 206). The bit level Stop Point value indicates the number of least significant bits (or the number of bit levels) of the data array that are not to be encoded.

If more encoding is required (step 204-Y), then nodes in the LSN list 144 are processed by a LSN encoding procedure (step 208), the blocks in the LB list 142 are processed by a LB encoding procedure (step 210) and the nodes in the LLN list 146 are processed by a LLN encoding procedure (step 212). Then the bit level, m, is decremented by one (step 214) and the main encoder loop (steps 204, 208, 210, 212, 214) repeats until all the bit levels of the data array that are to be encoded have, in fact, been encoded.

Figure 7:
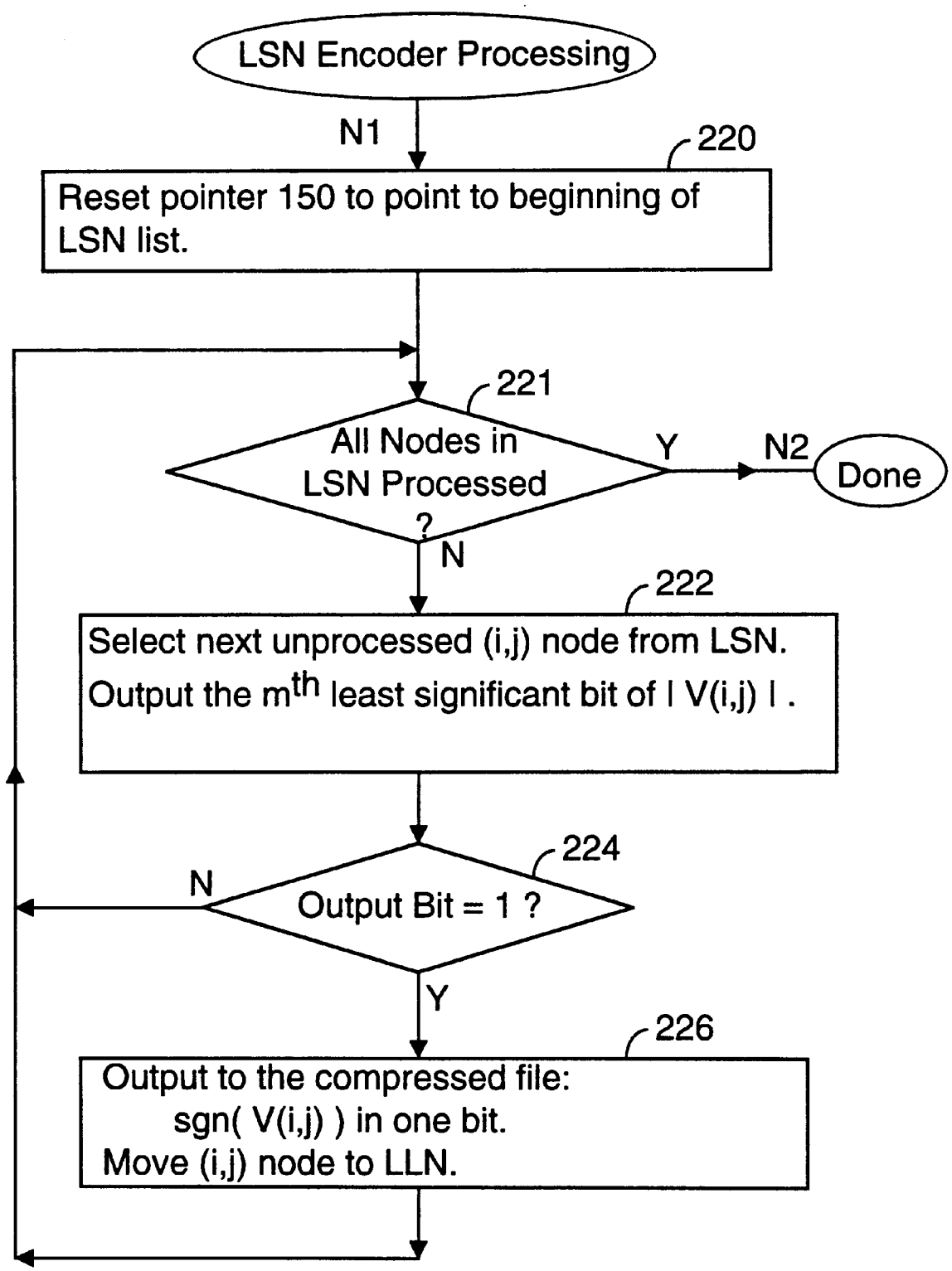

Referring to FIG. 7, the LSN encoding procedure begins by resetting the pointer 150 to the next unprocessed node to the very first item in the LSN list (step 220), and then determining if there is at least one node listed in the LSN list 144 that has not yet been processed (step 221). The procedure selects the next unprocessed node (i,j) from the LSN list and outputs the $m^{th}$ least significant bit of the node's absolute value, |V(i,j)| (step 222).

If the $m^{th}$ least significant bit of the selected node's absolute value |V(i,j)| is 0 (step 224), then processing of the selected node is complete for the current iteration of the LSN encoding procedure's processing loop. Otherwise, if the bit value output in step 222 for the current selected node is 1, the procedure outputs one bit equal to sgn(V(i,j)), and furthermore the current selected node is moved to the list of large nodes LLN (step 226).

The LSN encoding procedure of FIG. 7 continues until all the nodes in the LSN list have been processed. When the procedure is completed, the nodes previously in the LSN list whose absolute value was greater than or equal to $2^{m-1}$ have been moved to the LLN list, while for each of the other nodes in the list a "0" bit has been output to indicate that each of those nodes have an absolute value less than $2^{m-1}$.

Figure 8:
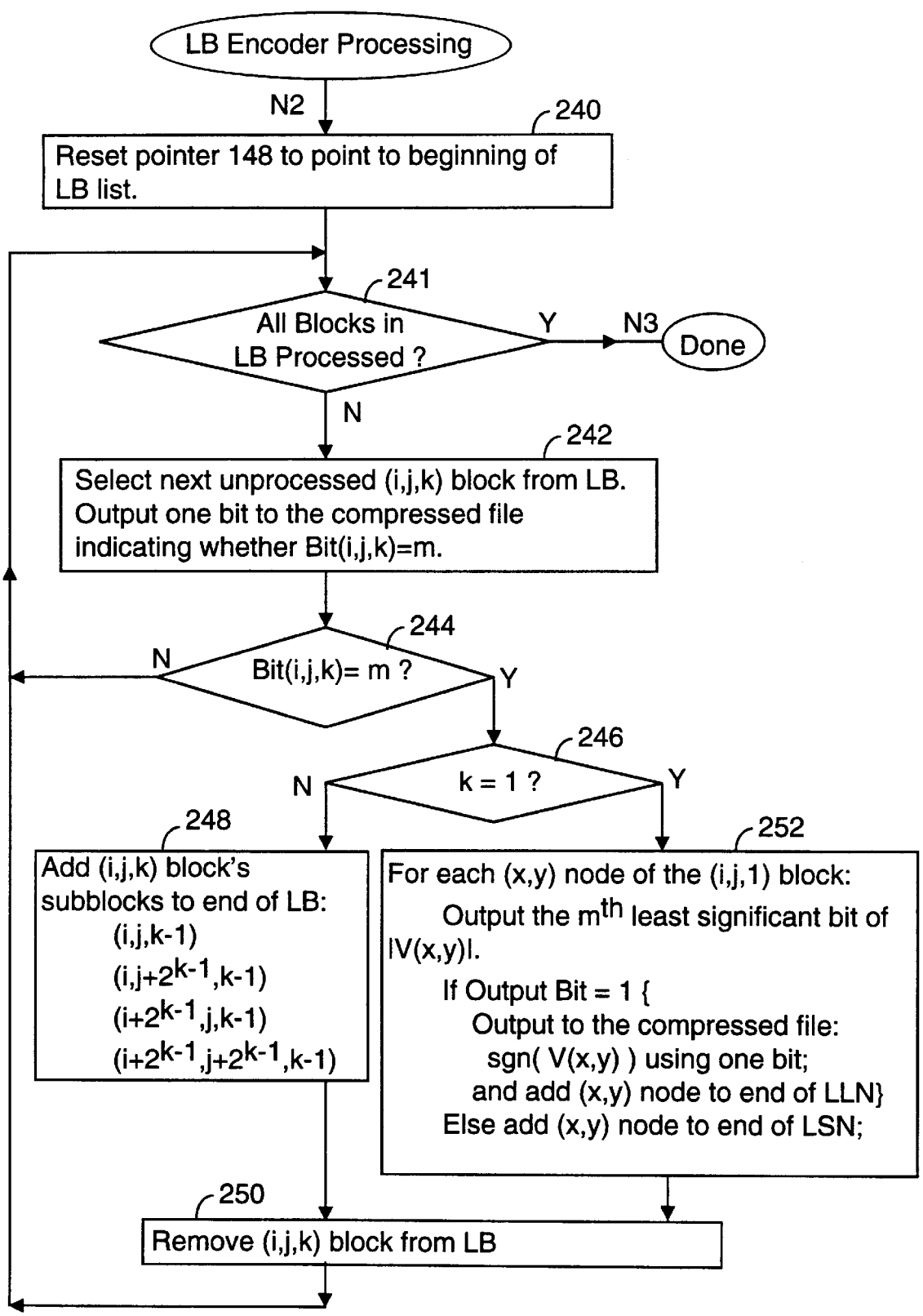

Referring to FIG. 8, the LB encoding procedure begins by resetting the "next unprocessed block" pointer 148 to point to the very first item in the LB list (step 240), and then determining if there is at least one block listed in the block list LB 142 that has not yet been processed (step 241). If there isn't at least one block in the LB 142 that has not yet been processed (241-Y), the LB encoding procedure exits. Otherwise it selects a next unprocessed data block (i,j,k) from the block list LB 142 and one bit is output to indicate whether or not Bit(i,j,k) equals m (step 242). Thus, if there is at least one node in the (i,j,k) block whose absolute value is greater than or equal to $2^{m-1}$, a 1 bit is output and otherwise a 0 bit is output.

If the maximum absolute value of the nodes in the selected block V(i,j,k) is less than $2^{m-1}$ (i.e., if the bit value output in step 242 is 0) (step 244-N), then processing of the selected block is complete for the current iteration of the LB encoding procedure. Otherwise, if the bit value output in step 242 for the current selected block is 1, the selected block is processed further. In particular, if the block's size is greater than 2×2 the selected block is divided into four smaller blocks (i,j,k−1), (i,j+$2^{k-1}$,k−1), (i+$2^{k-1}$,j,k−1), and (i+$2^{k-1}$,j+$2^{k-1}$,k−1), and those smaller blocks are added to the end of the block list LB 142 (step 248). In addition, the selected block (i,j,k) is removed from the block list LB 142 (step 250).

If the selected block is a minimum size block (2×2), then the following operations are performed on each of the four nodes (x,y) in the selected block (step 252). First, the $m^{th}$ least significant bit of the node's absolute value |V(x,y)| is output. Next, if the node has a "large value" (meaning that $|V(x,y)| \geq 2^{m-1}$) then one bit is output representing the sign of the node's value, sgn(V(x,y)), and the node (x,y) is added to the end of LLN 146. Otherwise, if $|V(x,y)| < 2^{m-1}$ then the node (x,y) is added to the end of LSN 144. In addition, the selected block is removed from the block list (250).

Figure 9:
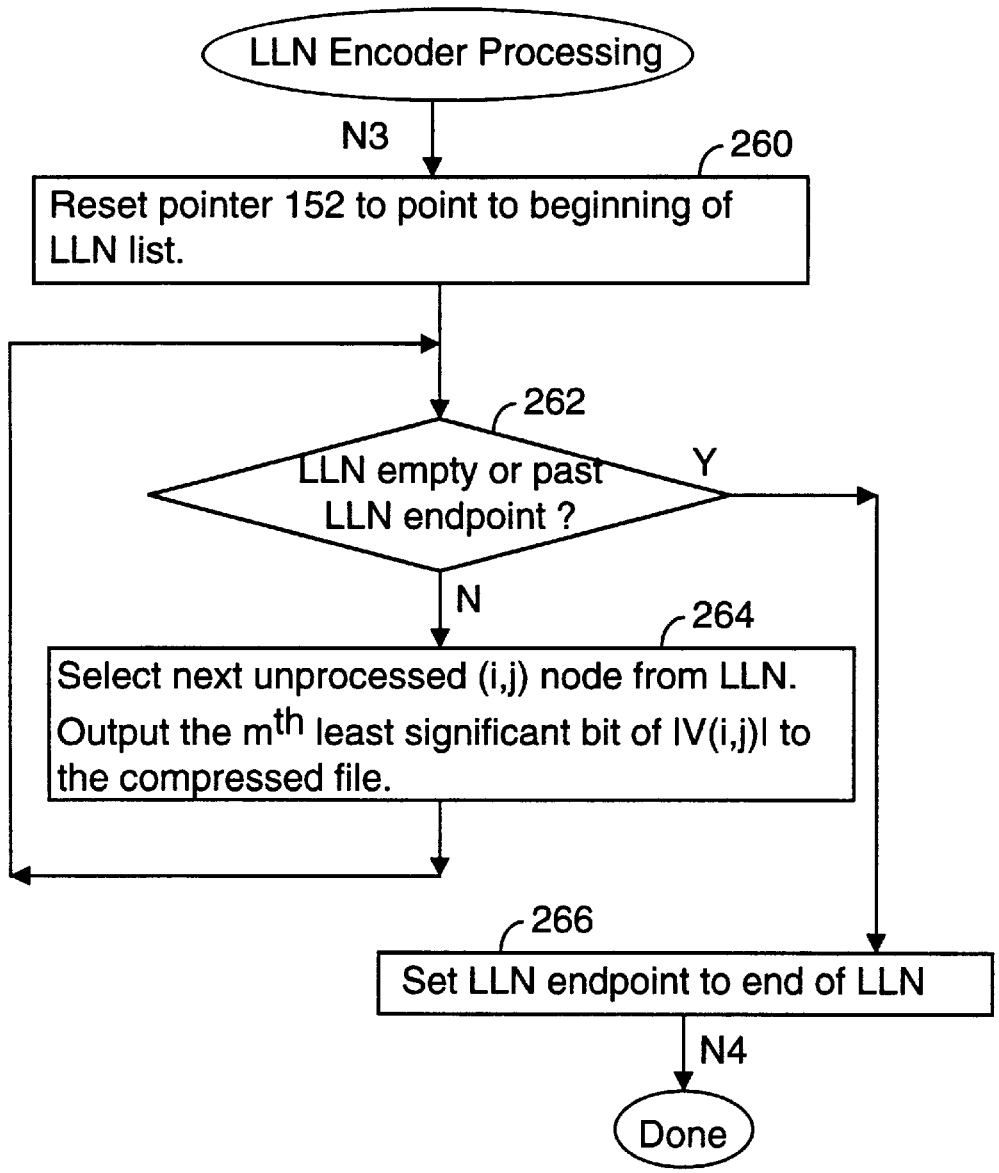

The above described procedure continues until all the blocks in the block list have been processed (step 241), at which point the LB encoding procedure exits. Referring to FIGS. 3C and 9, the purpose of the pointer 154 to the LLN end point is to limit processing of the LLN list to those nodes that were in the LLN list before the LB encoding procedure was executed for the current bit level. The LLN encoding procedure begins by resetting the "next unprocessed node" pointer 152 to point to the very first item (if any) in the LLN list (step 260), and then determining if either (A) the LLN list is empty or (B) the LLN end point has 154 been reached (step 262). If no unprocessed nodes remain in LLN (262-Y), the pointer to the LLN end point is set to point to the last item in the LLN list (264). Otherwise (262-N), the procedure selects the next unprocessed node (i,j) from LLN and outputs the $m^{th}$ least significant bit of |V(i,j)| to the compressed file (step 264).

The LLN encoding procedure of FIG. 9 continues until all the nodes in LLN, up through the node referenced by the pointer 154 to the LLN end point, have been processed (262).

Figure 10:
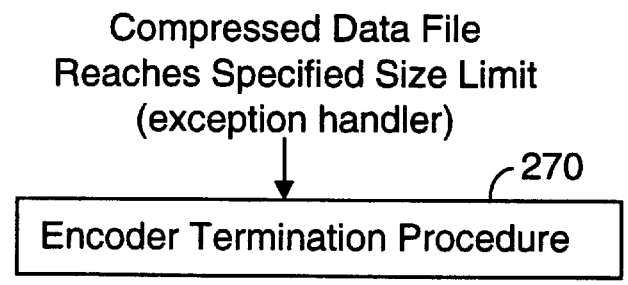

Referring to FIGS. 6 and 10, if during the user or the encoder sets a size limit for the compressed data file, for instance to ensure that transmission time of the file will meet a particular time limit, and during the encoding process the encoded data file reaches that size limit, a encoding termination procedure is automatically invoked (270), so as to close the compressed data file and to terminate the encoder procedure in an orderly manner.

Decoder Procedure

Figure 5:
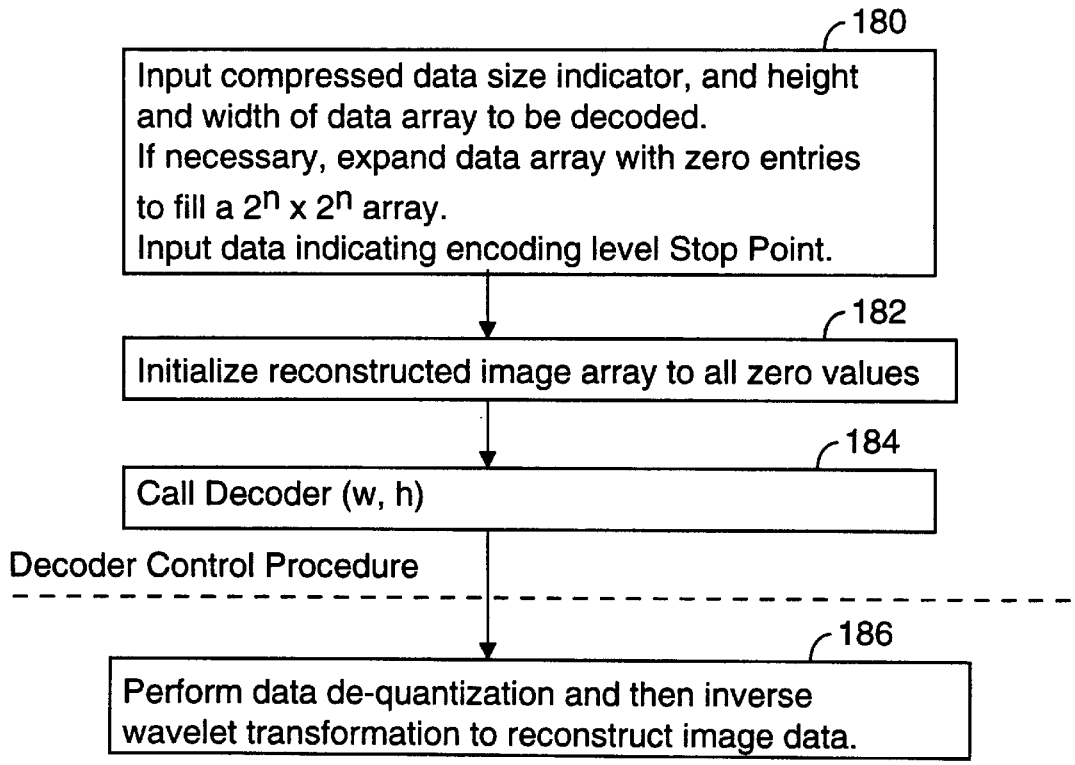
Figure 11:
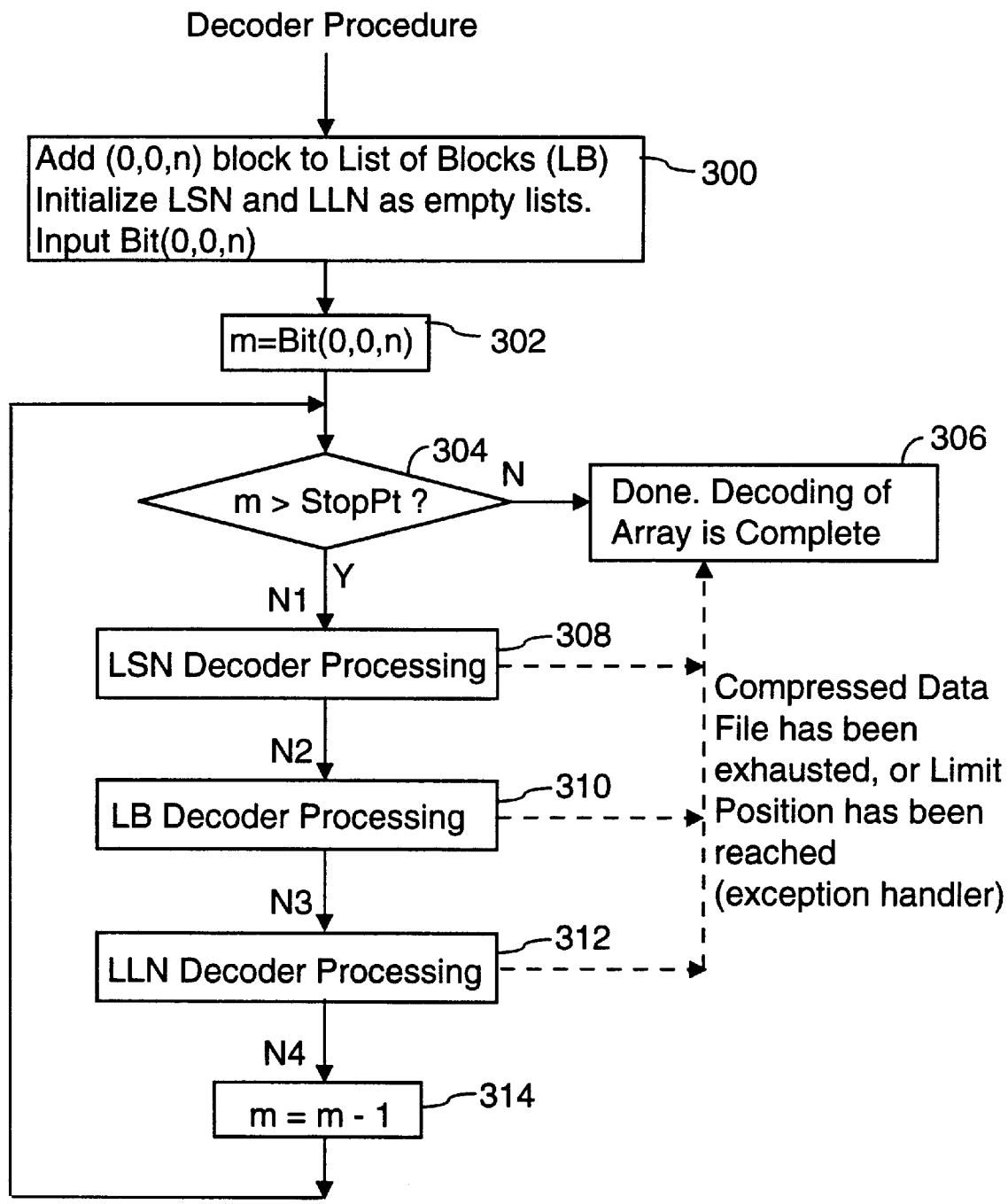
FIG. 11, 12, 13, 14 and 15 are flow charts of a preferred embodiment of the data decoding method of the present invention.

Referring to FIGS. 5 and 11, the decoder procedure 138 works, in general, by reading and interpreting the encoded data so as to reverse the process performed by the encoder procedure 136. The bits of the encoded data are read, in order, in a single pass from the first bit to the last. When the last data bit in the encoded data has been processed, reconstruction of the encoded data array is complete.

As the encoded data is read, entries are added to the block list LB 142 and the two node lists LSN 144 and LLN 146 to identify the data blocks and nodes that will be processed later in the decoder procedure. Data representing blocks and nodes are analyzed in the order they appear in the encoded data.

Referring to FIG. 5, the decoder procedure begins by reading (inputting) from the encoded data the size of the compressed data file, and the height and width of the data array to be decoded and reconstructed (step 180). If the height and width of the data array are not both equal to $2^n \times 2^n$ for some integer n, the reconstructed data array 126 is expanded with zero entries so that the data array being decoded is a $2^n \times 2^n$ array. Also in step 180, an encoding level Stop Point value is input to the compressed data file.

The reconstructed image array is initialized to all zero values (step 182), and then the main decoder procedure is called (step 184). After the decoding process is complete, the resulting reconstructed data may be subjected to a post-processing procedure (step 186), such as a reverse wavelet transformation procedure so as to reconstruct an image file.

Referring to FIG. 11, the procedure for decoding a set of encoded data representing an array of $2^n \times 2^n$ data values begins by putting a first entry, representing the entire $2^n \times 2^n$ analysis array, in the list of blocks (step 300). The list of blocks LB is empty except for this first entry. Also, at step 300 the decoding procedure initializes LSN and LLN as empty lists and inputs a "bit length value", Bit(0,0,n), having a predefined number of bits (e.g., 4 bits) that represents the maximum number of bits needed to encode any node data value in the entire array being decoded.

The bit level control variable "m" is set equal to Bit(0,0,n) so that m initially indicates the most significant non-zero bit of any node's absolute value in the data array. If Bit(0,0,n) is equal to zero (step 304), that indicates that all the nodes in the array to be encoded are equal to zero, and therefore the encoding procedure is complete (step 306).

More generally, if the current bit level, m, is greater than the designated Stop Point (step 304) (StopPt in the figures), that indicates that further decoding of the compressed data is required. If m is not greater than the Stop Point, this indicates that decoding of the compressed data has been completed (step 306). The bit level Stop Point value indicates the number of least significant bits (or the number of bit levels or bit planes) of the compressed data that are not to be decoded. While the Stop Point value used by the decoder in the preferred embodiment is the same as the Stop Point used by the encoder, in alternate embodiments the user of the decoder could select a different Stop Point value so long as the decoder Stop Point value is at least as large as the Stop Point value used by the encoder for a particular compressed file.

If more decoding is required (step 304-Y), then (A) nodes in LSN 144 are processed (step 308) by a LSN decoding procedure, the blocks in LB 142 are processed (step 310) by a LB decoding procedure, and the nodes in LLN 146 are processed (step 312) by a LLN decoding procedure. Then the bit level, m, is decremented by one (step 314) and the main decoder loop (steps 304, 308, 310, 312, 314) repeats until all the bit levels of the data array that are to be decoded have, in fact, been decoded.

Figure 12:
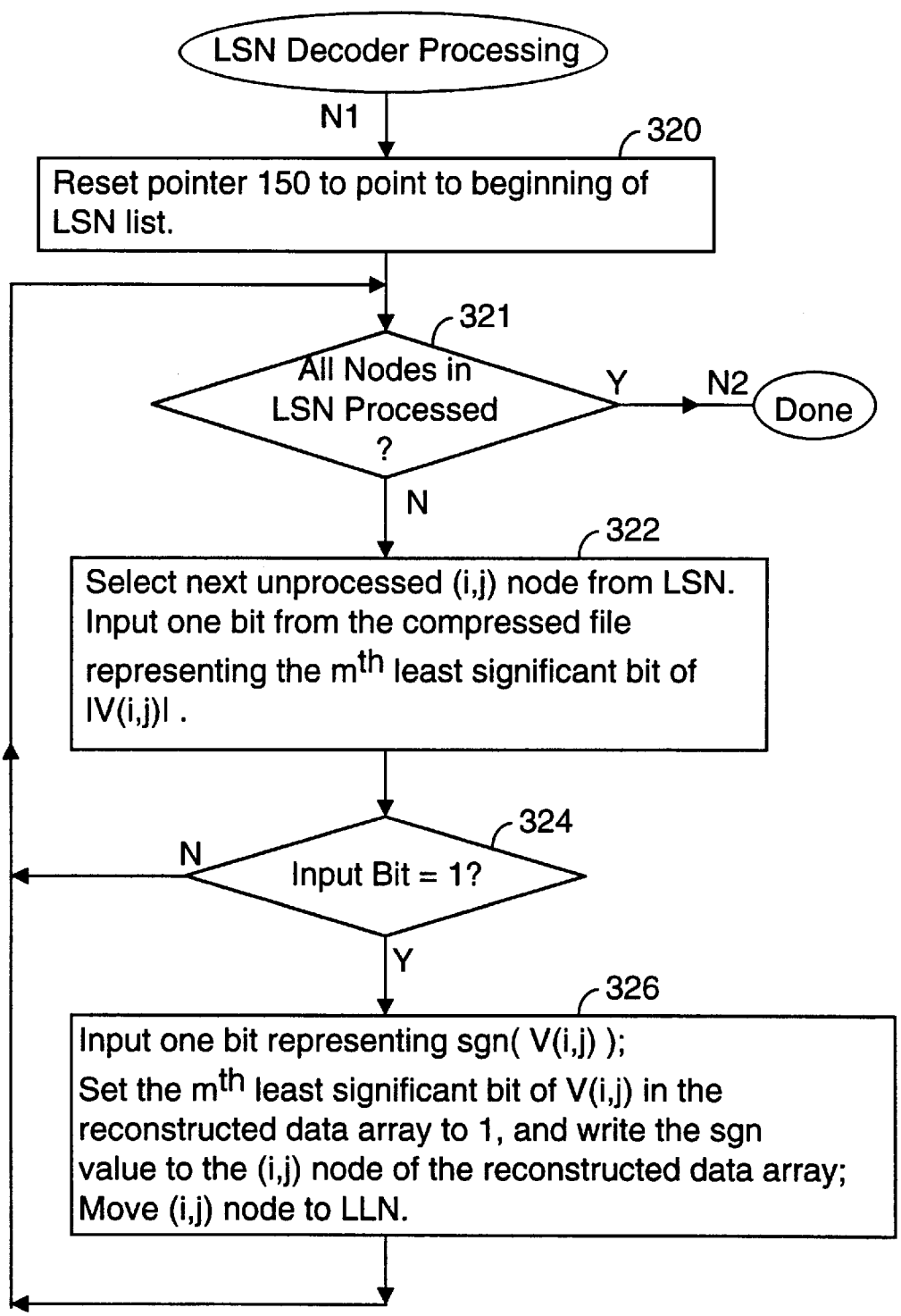

Referring to FIG. 12, the LSN decoding procedure begins by resetting the "next unprocessed node" pointer 150 to point to the very first item in LSN (step 320), and then determining if there is at least one node listed in LSN 144 that has not yet been processed (step 321). The procedure selects the next unprocessed node (i,j) in LSN, inputs the $m^{th}$ least significant bit of $|V(i,j)|$ from the compressed file (322).

If the input bit is 0 (step 324), then processing of the selected node is complete for the current iteration of the LSN decoding procedure's processing loop. Otherwise, if the bit value input in step 322 for the current selected node is equal to 1, the procedure sets the $m^{th}$ least significant bit of the (i,j) node in the reconstructed image array to 1, inputs a bit representing the sign of V(i,j), sets the sign of the (i,j) node in the reconstructed image array accordingly, and also moves the (i,j) node from LSN to LLN (step 326).

The LSN decoding procedure of FIG. 12 continues until all the nodes in LSN have been processed. When the procedure is completed, the nodes previously in LSN whose absolute value was greater than or equal to $2^{m-1}$ have been moved to LLN.

Figure 13:
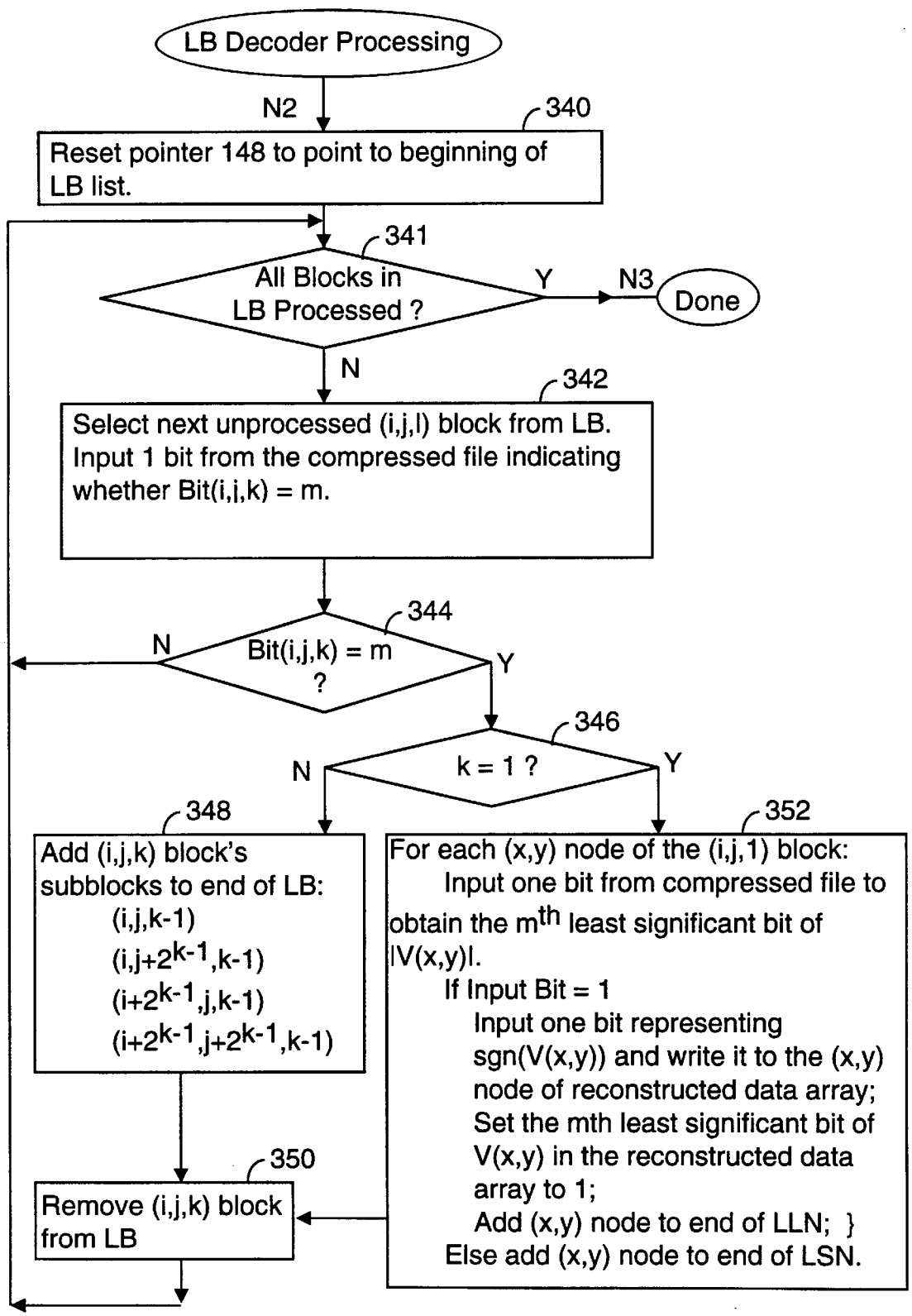

Referring to FIG. 13, the LB decoding procedure begins by resetting the "next unprocessed block" pointer 148 to point to the very first item in the LB list (step 340), and then determining if there is at least one block listed in the LB list 142 that has not yet been processed (step 341). If the LB list 142 is empty (241-Y), the LB decoding procedure exits. Otherwise it selects a next unprocessed data block (i,j,k) from the block list LB 142 and one bit is input from the compressed data file, the value of which indicates whether or not Bit(i,j,k) is equal to m (step 342). Thus, if a 1 bit was input there is at least one node in the (i,j,k) block whose absolute value is greater than or equal to $2^{m-1}$, otherwise, if a 0 bit was input, all the nodes in the (i,j,k) block have absolute value less than $2^{m-1}$.

If the maximum absolute value of all the nodes in the selected block V(i,j,k) is less than $2^{m-1}$ (i.e., if the bit value input in step 342 is 0) (step 344-N), then processing of the selected block is complete for the current iteration of the LB decoding procedure's processing loop. Otherwise, if the bit value input in step 342 for the current selected block is 1 (344-Y), the selected block is processed further. In particular, if the block's size is greater than 2×2, the selected block is divided into four smaller blocks (i,j,k−1), (i,j+$2^{k-1}$,k−1), (i+$2^{k-1}$,j,k−1), and (i+$2^{k-1}$,j+$2^{k-1}$,k−1), and those smaller blocks are added to the end of the list of blocks LB 142 (step 348). In addition, the selected removed from the list of blocks LB 142 (step 350).

If the selected block is a minimum size block (2×2), then the following operations are performed for each of the four nodes (x,y) in the selected block (step 352). First, the $m^{t}h$ least significant bit of $|V(x,y)|$ is input. If a 1 bit in input, then $|V(x,y)| \geq 2^{m-1}$; otherwise $|V(x,y)| < 2^{m-1}$. Next, if the node has a "large value" (meaning that $|V(x,y)| \geq 2^{m-1}$) then (A) another bit is input that represents the sign of the node's value, sgn(V(x,y)), (B) a "1"bit is written to the $m^{th}$ least significant bit of the (x,y) node in the reconstructed data array and the sign bit is also written to the (x,y) node of the reconstructed data array, and (C) the node (x,y) is added to the end of LLN 146. Otherwise, if $|V(x,y)| < 2^{m-1}$, then the node (x,y) is added to the end of LSN 144. In addition, the selected block is removed from the block list LB (350).

The above described LB decoding procedure continues until all the blocks in the block list have been processed (step 341), at which point the LB decoding procedure exits.

Figure 14:
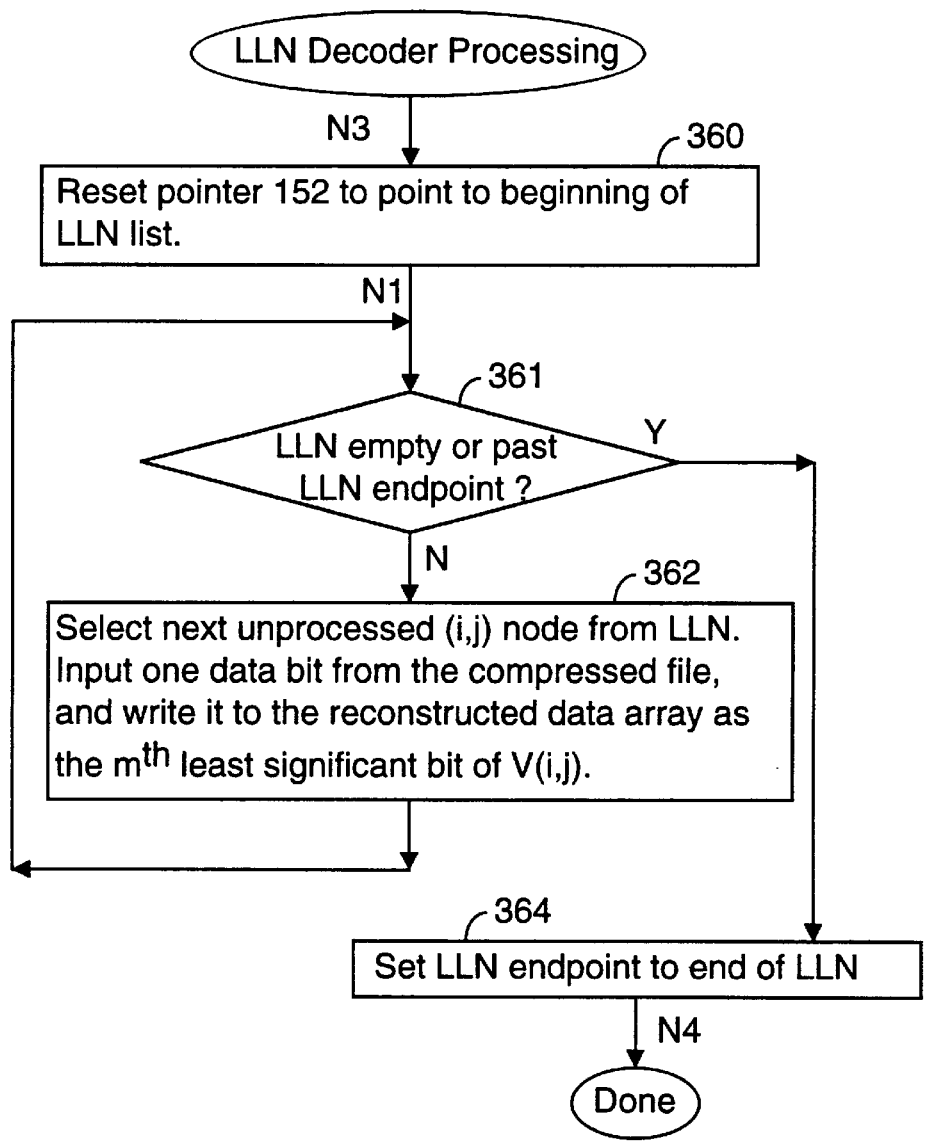

Referring to FIG. 14, the LLN decoding procedure begins by resetting the "next unprocessed node" pointer 152 to point to the very first item in LLN (step 360), and then determining if either (A) LLN is empty or (B) the LLN end point has 154 been reached (step 361). If there are no remaining nodes on LLN (361-Y), the pointer to the LLN end point is set to point to the last item in LLN (364). Otherwise (361-N), the procedure selects the next unprocessed node (i,j) from LLN and inputs one data bit from the compressed data file. That data bit is then written to the reconstructed data array as the $m^{th}$ least significant bit of the (i,j) node (step 362).

The LLN encoding procedure of FIG. 14 continues until all the nodes in LLN, up through the node referenced by the LLN end point pointer 154, have been processed (361).

Figure 15:
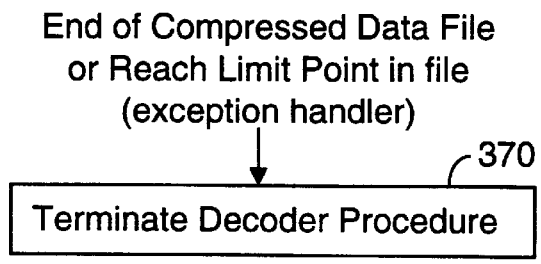

Referring to FIGS. 11 and 15, if the user or the decoder sets a compressed data quantity limit, for instance to ensure that decoding is completed within a particular time period, and the amount of data decoded reaches that limit, or if the decoder reaches the end of the compressed data file, a decoding termination procedure is automatically invoked (370) so as to close the compressed data file and the reconstructed image array file, and to terminate the decoder procedure in an orderly manner.

Reducing Encoder and Decoder Memory Requirements

For large data arrays, such as data arrays representing either large, or high pixel density images, the amount of memory required by the LSN and LLN node lists can be significant, exceeding the amount memory required to represent the actual data array and the compressed data. To make the present invention practical for use in desktop computers with limited memory resources, two alternate embodiments are provided that reduce the memory requirements associated with the present invention.

Figure 16:
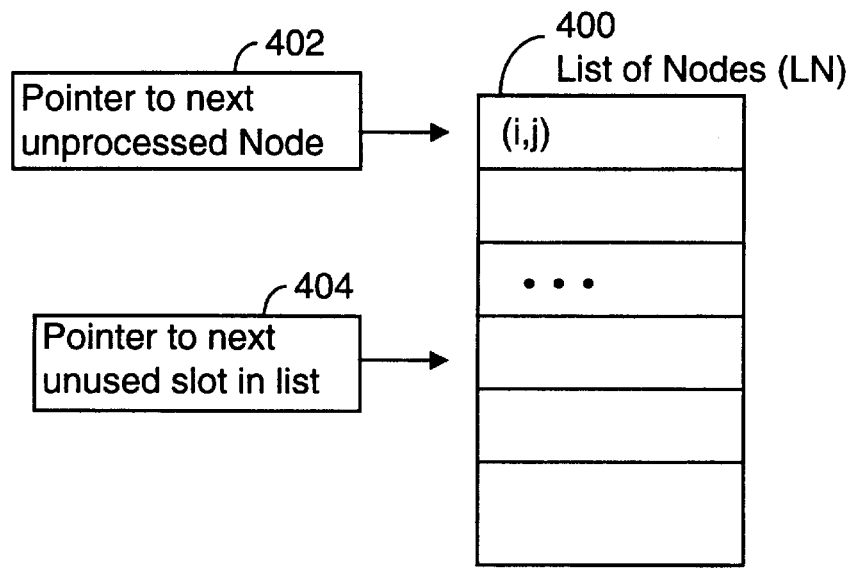
FIGS. 16 and 17 show data structures used in second and third preferred embodiments of the present invention so as to reduce the amount of memory required by the encoder and decoder methods to encode and decode an array of data.

Referring to FIG. 16, in a first alternate embodiment the two node lists (LSN and LLN) used by the encoder and decoder can be combined into a single data structure 400 with two pointers 402, 404 for keeping track of the current node position and node list endpoint, respectively. Optionally, each entry in the list can include a flag to indicate the list (LSN or LLN) to which it belongs; however the use of such a flag is not necessary. In particular, in both the encoder and decoder the following criteria can be used to dynamically determine (during program execution) the list to which each entry in the combined list 400 belongs:

The current bit plane being processed is the $m^{th}$ bit plane.

During execution of the LSN encoding or decoding procedure the node entry for node (i,j) is initially on LSN (at step 222 and 322 of the procedure) if $|V(i,j)| < 2^m$.

During execution of the LLN encoding or decoding procedure the node entry is on the portion of LLN before the LLN endpoint (at step 264 and 364 of the procedure) if $|V(ij)| \geq 2^{m+1}$.

Items are not "moved" from the LSN to LLN. Rather, membership in the LSN and LLN are determined by the value ranges specified above, which in turn are determined by the bit plane currently being processed.

In other words, the LSN and LLN encoding procedures need to access both the list data structure 400 and the raw data array 122 to determine which nodes are on which of the two lists, and similarly the LSN and LLN decoding procedures need to access both the data structure 400 and the data in the reconstructed data array 126 to determine which nodes are on which of the two lists. Steps 221 and 222 in FIG. 7; steps 262 and 264 in FIG. 9; steps 321 and 322 in FIG. 12, and 361 and 362 in FIG. 14 are all revised to search for the next item, if any, on the combined node list 400 that meets the criteria for an item on the LSN or LLN list. Also, in steps 226 and 326 there is no longer any need to "move" a node from LSN to LLN, since all such list movements are not implied by the absolute values of the nodes.

It should be noted that the order of the compressed data in the compressed data file in this embodiment will be different from data order in the first embodiment because the order of the items in the LLN list will be different in these two embodiments. (The order of the items in the LB and LSN lists remains unchanged.) Therefore it is necessary for both the encoder and decoder to use the same node list data structure for the encoding/decoding process.

The execution time of this "combined node list" embodiment may be longer than that of the first preferred embodiment because in this second embodiment data values in the raw data array or reconstructed data array must be repeatedly accessed and compared against a threshold value, $2^m$, simply to determine which list each node belongs to, while such comparisons are not required in the first preferred embodiment.

Figure 17:
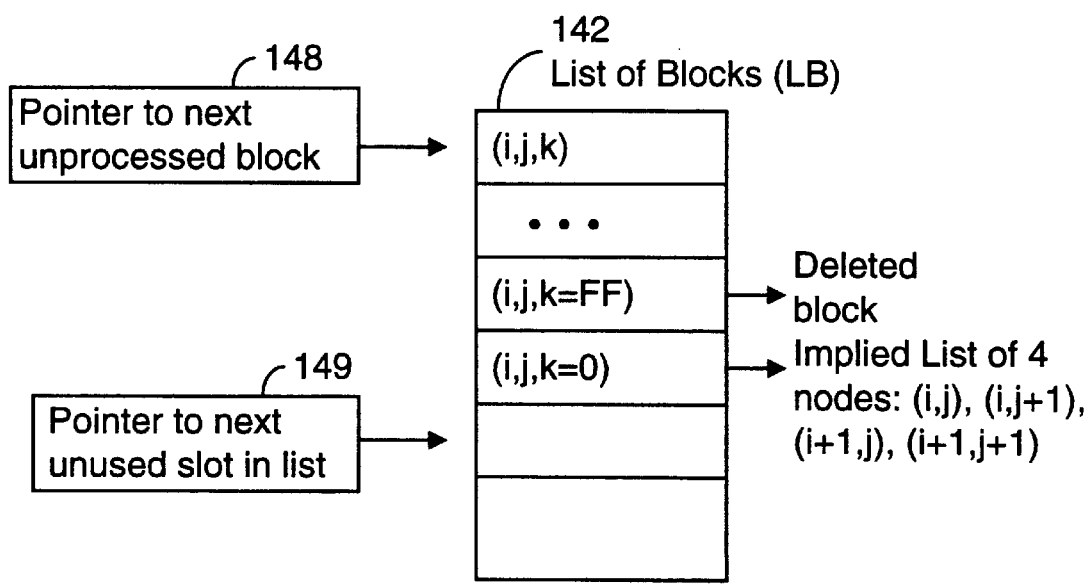

Referring to FIG. 17, even more memory is saved in a second alternate embodiment by eliminating the data structures for storing the LSN and LLN lists entirely. Instead, in this embodiment, minimum size node blocks(i.e., 2×2 blocks) on the block list 142 are not deleted from that list when they are divided into four nodes. Rather, the block is marked on the list as having been divided (by using a unique block size value, such as 0), and each block on the block list that is marked is treated as an implied list of four nodes: (i,j), (i,j+1), (i+1,j), (i+1,j+1). (Larger blocks deleted from the LB list can be either removed from the list, requiring movement of all items lower in the list, or marked as deleted by setting one of the three parameters in the deleted entry to special marker value, such as $FF_{16}$.) Thus, the list of nodes at any one time consists of the set of nodes represented by the specially marked blocks.

Also, in steps 226 and 326 there is no longer any need to "move" a node from LSN to LLN, since all such list movements are now implied by the absolute values of the nodes. Further, in steps 252 and 352 there is no longer any need to put any nodes on the ends of the LSN or LLN lists. Instead, in steps 252 and 352 the block entry is marked as representing a set of nodes.

The exact same criteria for determining which nodes are on LSN and which are on LLN as those used in the embodiment corresponding to FIG. 16 are used again for this embodiment. Thus, each node on the implied node list whose absolute value is less than $2^m$ is treated as being on LSN, and each other node on the implied node list is treated as being on the portion of LLN before the LLN end point.

Once again, the order of the compressed data in the compressed data file in this "implied node list" embodiment will be different from data order in the first and second embodiments because the order of the items in the LSN and LLN lists will be different than in the other two embodiments. (The order of the items in the LB lists remains unchanged.) Therefore it is necessary for both the encoder and decoder to use the underlying list data structure(s) for the encoding/decoding process.

The execution time of this "implied node list" embodiment may be longer than that of the first preferred embodiment because in this embodiment data the implied node positions (i.e., implied by block list entries) must be generated and regenerated every time the block list is traversed by the LSN and LLN encoder/decoder procedure, and the values in the raw data array or reconstructed data array must be repeatedly accessed and compared against a threshold value, 2m, to determine which list (LSN or LLN) each node belongs to, while such comparisons are not required in the first preferred embodiment.

On-The-Fly Partial Image Reconstruction During Compressed Data Delivery

Referring to FIGS. 4 and 5, in step 176 of the encoding procedure the size of the compressed data file is inserted at the beginning of the compressed data file. Alternately, that information could be pre-pended to the compressed data file by the data transmission procedures 128 used for delivering the compressed data from one computer system to another. The compressed data file size information is read by the decoder procedure at step 180. Furthermore, in the preferred embodiment the decoder procedure reads and processes the compressed data as it is being received (i.e., it does not wait for the end of the file to be received before processing the data received so far). Compressed data is typically delivered as a stream of data packets, the size of which is dictated by the data communication systems being used. To the extent that a sequentially complete subset of the compressed data has been received, that data can be processed by the decoder procedure before the subsequent portions of the compressed data is received.

Figure 18:
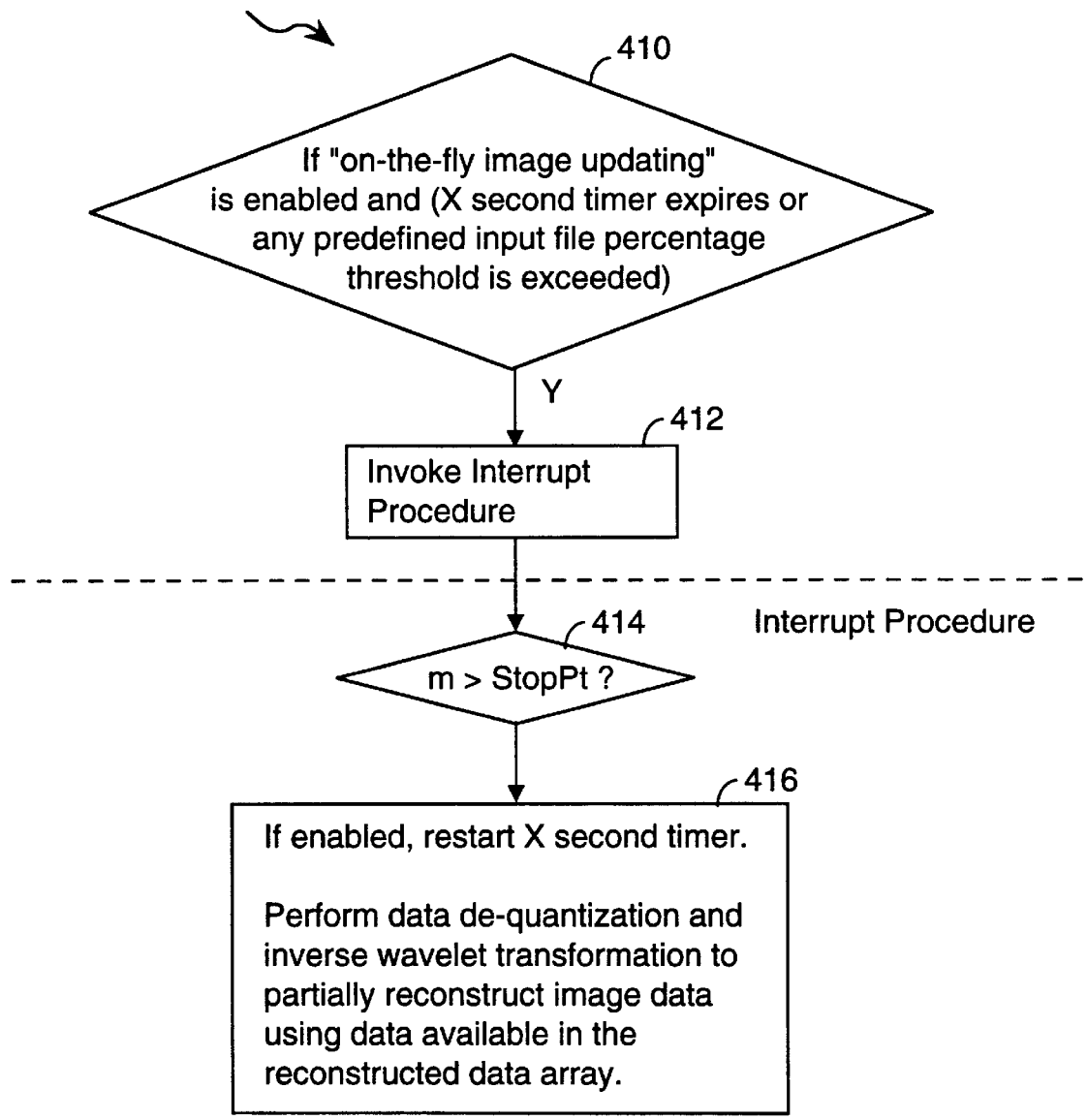
FIGS. 18 and 19 show alternate embodiments in which a partially reconstructed image is generated and updated from compressed data that is being received over a slow communication channel.

Referring to FIG. 18, in a preferred embodiment an "on-the-fly" partial image reconstruction interrupt procedure is enabled whenever a compressed image file is being received where either the compressed data file is so large, or the rate of data delivery is so slow, that the file will take more than N seconds to receive (e.g., 20 seconds) (step 410). The interrupt procedure has two user-selectable modes. In a timer based mode, a partially reconstructed image is generated and updated every X seconds (e.g., every 10 seconds), based on the compressed data received up to that point, until the full compressed data file is received. In a "file percentage" mode, a partially reconstructed image is generated and updated at each of several percentage thresholds (e.g., upon receiving, 30, 50, 70 and 90 percent of the compressed data file), based on the compressed data received up to that point, until the full compressed data file is received.

Because the present invention puts the most significant bit planes of the compressed data at the beginning of the compressed data array or file, the receiving system can begin to reconstruct the data array or image as soon as a couple of full bit planes of data have been received and decoded. Of course, the quality of the reconstructed image improves with the receipt of additional compressed data, but the user is not forced to wait for all the compressed data to be received before viewing the associated image. As a result, the user may be able to make useful evaluations of the image or other data being received before the full compressed data file is received. For instance, upon viewing the partially reconstructed image the user may decide to terminate the transmission of the compressed data (e.g., if he/she determines that the wrong image has been requested, or the partially reconstructed image already provides the information needed by the user).

If the on-the-fly image updating is enabled and either the timer expires and/or a predefined input file percentage threshold (e.g., 30, 50, 70 or 90 percent of the compressed data file) is exceeded (step 410) the interrupt procedure is invoked (step 412) by the computer's operating system. The interrupt procedure first makes sure that the compressed data has not already been fully decoded by the decoder procedure (step 414). If not, the compressed data that has been decoded so far is dequantized and inverse wavelet transformed so as to generate a partially reconstructed image (step 416).

Generally, even when the receiving computer is a desktop computer having moderate computational power, the data decoding process will tend to be much, much faster than the rate at which data is received over a standard telephone connection or even an ISDN line. Therefore, whenever the interrupt procedure is called, the decoder procedure is likely to have decoded all or almost all of the data received so far by the receiving system. If faster communication connections are used, such as a cable modem or a network having a T1 Internet connection, use of the on-the-fly image updating interrupt procedure will typically be disabled because transmission of the full compressed data file is unlikely to take more than a few seconds.

In one preferred embodiment, compressed data continues to be received during execution of the interrupt procedure, but not decoded. In other embodiments that use multi-threading, execution of the decoder procedure could be allowed to continue while the interrupt procedure processes the previously decoded data.

Figure 19:
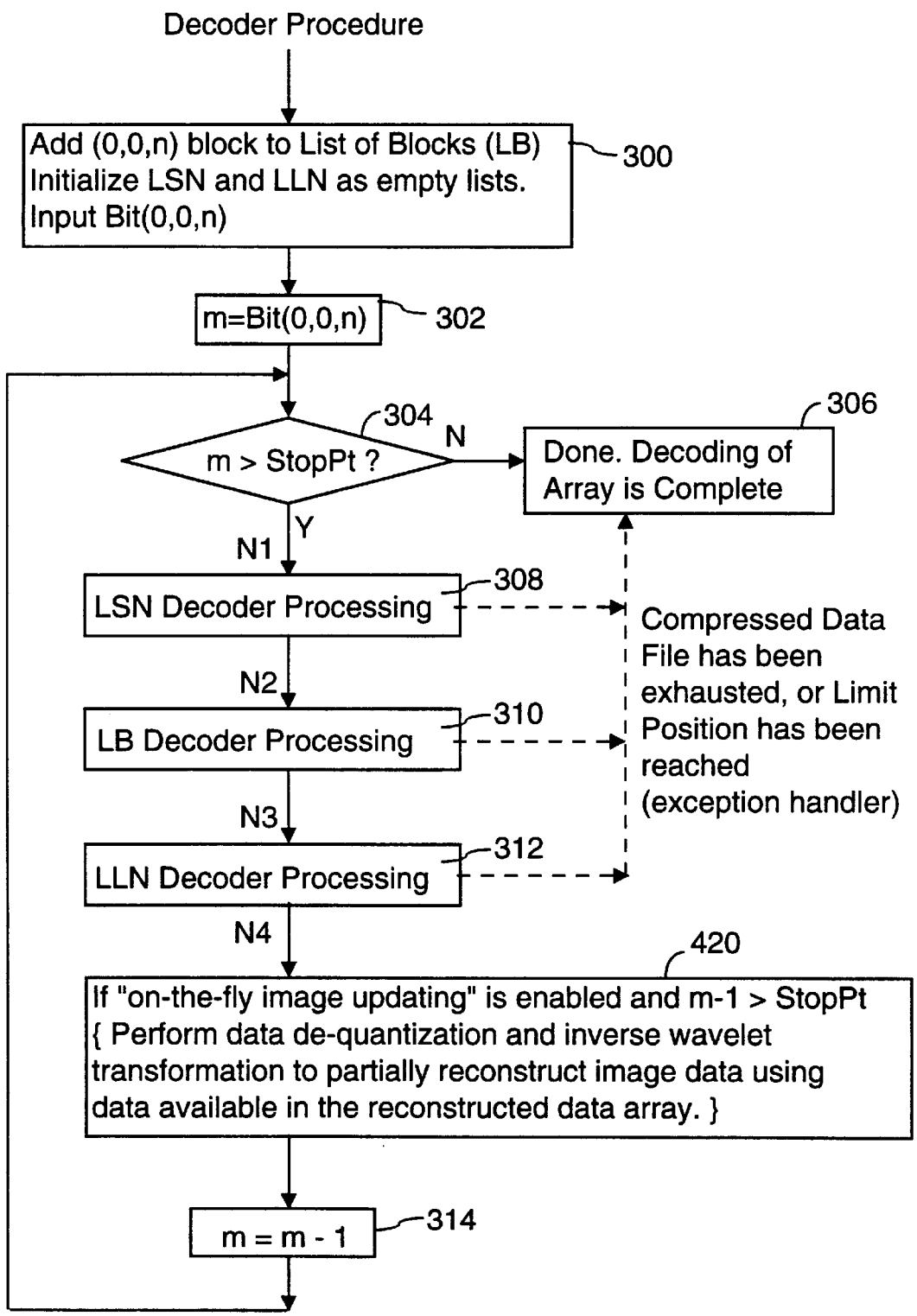

Referring to FIG. 19, in an alternate embodiment, the decoder procedure can be modified so as to generate a partially reconstructed image after each full bit plane of data has been decoded (step 420), so long as on-the-fly image updating is enabled.

Additional Alternate Embodiments

While the description of the invention above has generally indicated that a system using the invention would have both an encoder and decoder, it is anticipated that in many commercial embodiments only a small number of users or machines would include both an encoder and decoder, while large numbers of user or machines would include only a decoder. For instance, decoders in accordance with the present invention might be included in a library of image viewer procedures distributed to users of various World Wide Web browsers, while only users interested in sending or distributing images to other persons might license the use of the encoder.

In an alternate embodiment, some or all of the encoding or decoding processing steps are performed by hard coded logic circuitry that includes a state machine to control the sequential data processing. The state of the state machine is updated at each step in accordance with the data being processed and the data values stored in and read from the block list.

The present invention is equally applicable to the encoding and decoding of three-dimensional data arrays, and in fact is applicable to the encoding and decoding of N-dimensional data arrays where N is an integer greater than 0. For instance the data array being encoded and decoded could be a three dimensional array of size $2^n \times 2^n \times 2^n$. Each data block would have eight subblocks that is one eighth the size of its parent data block, and the minimum size data block would likely be 2×2×2 in size, with eight data values requiring encoding. Given this block sizing and subblock scheme, the encoding and decoding methods would remain unchanged in all other respects.

More generally, when successively identifying successively smaller data blocks, the number of data values contained in each identified data block (other than a block corresponding to the entire specified data array) will be equal to $2^{-N}$ times the number of data values in a corresponding parent data block, where N is an integer greater than zero. Thus, the encoding method could easily be modified so that the number of subblocks for each data block is two, or eight or sixteen, instead of the four used in the preferred embodiment, simply by redefining how each data block is to be divided into subblocks.

Further, the definition of the minimum size data block can be modified to be equal to any predefined number of data values, typically equal to an integer power of 2, and preferably equal to an integer power of 4. Thus, it would be easy to modify the encoding method to use minimum size data blocks of 16 data values by changing the decision at step 246 to test for k=2 (instead of k=1), and by generating sixteen output values in the block of the method for processing minimum size data blocks.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of encoding a specified data array, the data array comprising a set of nodes having associated data values, the node data values in the data array having associated therewith a set of bit planes, each bit plane X representing the Xth least significant bit for each of the nodes in the data array, comprising the steps of:

provided at least one list data structure for representing a list of blocks and at least one list of nodes;

initially storing in the list of blocks one or more block identifiers, each block identifier in the list of blocks representing a single, rectangularly shaped, contiguous block of nodes in the data array; each block identifier in the list of blocks specifying a location in the data array associated with the block represented by the block identifier and also specifying the size value of the block represented by the block identifier;

determining the most significant non-zero bit, m, of a node having a largest absolute value in the data array;

successively, for each bit plane X of the data array in a sequence of bit planes starting with X=m, generating data representing each such bit plane X, including:

for each block represented by a block identifier in the list of blocks, generating a single bit representing the Xth least significant bit of a node having a largest absolute value in the block;

when the single bit generated for a block corresponds to a non-zero Xth least significant bit of a node in the block, if the block is larger than a predefined minimum size block, dividing the block into a plurality of subblocks and adding block identifiers for the subblocks to the list of blocks, and otherwise dividing the block into individual nodes and adding the nodes to the at least one list of nodes; each of the subblocks consisting of a single, rectangularly shaped, contiguous block of nodes in the data array;

for each node represented in the at least one list of nodes, generating a single bit representing the Xth least significant bit of the node's data value; and when the single bit generated for a node corresponds to the node's most significant non-zero bit, further generating a sign bit indicating whether the node's data value is positive or negative; and storing the generated bits in a compressed data array.

2. The method of claim 1, determining a most significant bit plane, StopPt, that is not to be encoded;

wherein the sequence of bit planes X for which data is generated ends with bit plane X=StopPt+1.

3. The method of claim 1, when dividing a block into individual nodes, for each of the individual nodes generating a single bit representing the Xth least significant bit of the node's data value; and when the single bit generated for a node corresponds to a non-zero Xth least significant bit, generating a sign bit indicating whether the node's data value is positive or negative.

4. The method of claim 3, wherein the number of nodes in each block, other than a block corresponding to all nodes in the data array, is equal to $2^{-N}$ times the number of nodes in a corresponding parent block, where N is an integer greater than zero.

5. The method of claim 1, the at least one list data structure representing two node lists, including a small valued node list (LSN) and a large valued node list (LLN);

when dividing a block into individual nodes, placing on the LLN each of the individual nodes whose Xth least significant bit is equal to 1 and placing each of the other individual nodes on the LSN.

6. The method of claim 1, wherein when a block is divided into individual nodes the corresponding block identifier in the list of blocks is marked to indicate that the block identifier represents all the nodes in the corresponding block, listed in a predefined order; whereby the list of blocks in the at least one list data structure represents both a list of blocks and at least one list of nodes.

7. The method of claim 6, wherein the marked block identifiers in the list of blocks indirectly represent two nodes lists, wherein a first node list comprises individual nodes corresponding to the marked block identifiers having an absolute value less than $2^X$, and a second node list comprises individual nodes corresponding to the marked block identifiers that are not included in the first node list.

8. A computer program product for use in conjunction with a computer system, the computer program product comprising a computer readable storage medium and a computer program mechanism embedded therein, the computer program mechanism comprising:

a data encoding procedure, the data encoding procedure including instructions for establishing at least one list data structure for representing a list of blocks and at least one list of nodes; each block comprising a set of contiguous nodes in the array, the size of which of is specified in the at least one list data structure;

the data encoding procedure further including instructions for:

initially storing in the list of blocks, one or more block identifiers, each block identifier in the list of blocks representing a single, rectangularly shaped, contiguous block of nodes in the data array; each block identifier in the list of blocks specifying a location in the data array associated with the block represented by the block identifier and also specifying the size value of the block represented by the block identifier;

determining the most significant non-zero bit, m, of a node having a largest absolute value in the data array;

successively, for each bit plane X of the data array in a sequence of bit planes starting with X=m, generating data representing each such bit plane X, including:

for each block represented by a block identifier in the list of blocks, generating a single bit representing the Xth least significant bit of a node having a largest absolute value in the block;

when the single bit generated for a block corresponds to a non-zero Xth least significant bit of a node in the block, if the block is larger than a predefined minimum size block, dividing the block into a plurality of subblocks and adding the subblocks to the list of blocks, and otherwise dividing the block into individual nodes and adding the nodes to the at least one list of nodes;

for each node represented in the at least one list data structure, generating a single bit representing the Xth least significant bit of the node's data value; and when the single bit generated for a node corresponds to the node's most significant non-zero bit, further generating a sign bit indicating whether the node's data value is positive or negative; and storing the generated bits in a compressed data array.

9. The computer program product of claim 8, the encoder procedure further including instructions for:

determining a most significant bit plane, StopPt, that is not to be encoded;

wherein the instructions for generating data for a sequence of bit planes X stop generating data with bit plane X=StopPt+1.

10. The computer program product of claim 8, the encoder procedure further including instructions for:

when dividing a block into individual nodes, for each of the individual nodes generating a single bit representing the Xth least significant bit of the node's data value; and when the single bit generated for a node corresponds to a non-zero Xth least significant bit, generating a sign bit indicating whether the node's data value is positive or negative.

11. The computer program product of claim 10, wherein the number of nodes in each block, other than a block corresponding to all nodes in the data array, is equal to $2^{-N}$ times the number of nodes in a corresponding parent block, where N is an integer greater than zero.

12. The computer program product of claim 11, wherein the at least one list of nodes represents two node lists, including a small valued node list (LSN) and a large valued node list (LLN);

the encoder procedure including instructions for, when dividing a block into individual nodes, placing on the LLN each of the individual nodes whose Xth least significant bit is equal to 1 and placing each of the other individual nodes on the LSN.

13. The computer program product of claim 12, wherein the encoder procedure instructions for dividing a block into individual nodes includes instructions for marking the corresponding list entry to indicate that the entry represents all the nodes in the corresponding block, listed in a predefined order; whereby the list of blocks in the at least one list data structure represents both a list of blocks and at least one list of nodes.

14. The computer program product of claim 13, wherein the marked block identifiers in the list of blocks indirectly represent two nodes lists, wherein a first node list comprises individual nodes corresponding to the marked block identifiers having an absolute value less than $2^X$, and a second node list comprises individual nodes corresponding to the marked block identifiers that are not included in the first node list.

15. A method of decoding a set of encoded, compressed data representing a specified data array, the data array comprising a set of nodes having associated data values, the node data values in the data array having associated therewith a set of bit planes, each bit plane X representing the Xth least significant bit for each of the nodes in the data array, comprising the steps of:

providing at least one list data structure for representing a list of blocks and at least one list of nodes;

providing a reconstructed data array for storing node data values, and partially decoded portions thereof;

initially storing in the list of blocks, one or more block identifiers, each block identifier in the list of blocks representing a single, rectangularly shaped, contiguous block of nodes in the data array; each block identifier in the list of blocks specifying a location in the data array associated with the block represented by the block identifier and also specifying the size value of the block represented by the block identifier; and processing the encoded, compressed data in a same sequence in which it is stored therein so as to regenerate values in the data array, including:

reading a value from the encoded, compressed data that indicates the most significant non-zero bit, m, of a node having a largest absolute value in the data array;

successively, for each bit plane X of the data array in a sequence of bit planes starting with X=m, reading data from the encoded, compressed data representing each such bit plane X, including:

for each block represented by a block identifier in the list of blocks, reading a single bit representing the Xth least significant bit of a node having a largest absolute value in the block;

when the single bit read for a block corresponds to a non-zero Xth least significant bit of a node in the block, if the block is larger than a predefined minimum size block, dividing the block into a plurality of subblocks and adding the subblocks to the list of blocks, and otherwise dividing the block into individual nodes and adding the nodes to the at least one list of nodes; each of the subblocks consisting of a single, rectangularly shaped, contiguous block of nodes in the data array;

for each node represented in the list of blocks, reading a single bit representing the Xth least significant bit of the node's data value; and when the single bit read for a node corresponds to the node's most significant non-zero bit, storing the read bit in the Xth least significant bit of a corresponding node of the reconstructed data array, reading a sign bit indicating whether the node's data value is positive or negative, and storing the sign bit in the corresponding node of the reconstructed data array if the sign bit is equal to a predefined value.

16. The method of claim 15, determining a most significant bit plane, StopPt, that is not to be decoded;

wherein the sequence of bit planes X for which data is read from the encoded, compressed data ends with bit plane X=StopPt+1.

17. The method of claim 15, when dividing a block into individual nodes, for each of the individual nodes reading a single bit representing the Xth least significant bit of the node's data value and storing that bit in the Xth least significant bit of a corresponding node of the reconstructed data array, and when the single bit read for a node corresponds to a non-zero Xth least significant bit, reading a sign bit indicating whether the node's data value is positive or negative and storing the sign bit in the corresponding node of the reconstructed data array if the sign bit is equal to a predefined value.

18. The method of claim 17, wherein
the number of nodes in each block, other than a block corresponding to all nodes in the data array, is equal to $2^{31\,N}$ times the number of nodes in a corresponding parent block, where N is an integer greater than zero.

19. The method of claim 15,
the at least one list data structure representing two node lists, including a small valued node list (LSN) and a large valued node list (LLN);
when dividing a block into individual nodes, placing on the LLN each of the individual nodes whose Xth least significant bit is equal to 1 and placing each of the other individual nodes on the LSN.

20. The method of claim 15,
wherein when a block is divided into individual nodes the corresponding block identifier is marked to indicate that the block identifier represents all the nodes in the corresponding block, listed in a predefined order; whereby the list of blocks in the at least one list data structure represents both a list of blocks and at least one list of nodes.

21. The method of claim 20,
wherein the marked block identifiers in the list of blocks indirectly represent two nodes lists, wherein a first node list comprises individual nodes corresponding to the marked block identifiers having an absolute value less than $2^X$, and a second node list comprises individual nodes corresponding to the marked block identifiers that are not included in the first node list.

22. The method of claim 15, including:
performing the step of processing the encoded, compressed data concurrently while the encoded, compressed data is being received over a communication channel;
at predefined junctures while processing the encoded, compressed data, invoking a procedure for generating a partially reconstructed image from the data stored so far in the reconstructed data array, thereby enabling a user to view the partially reconstructed image before all the encoded compressed data has been received and decoded.

23. A computer program product for use in conjunction with a computer system, the computer program product comprising a computer readable storage medium and a computer program mechanism embedded therein, the computer program mechanism comprising:
a data decoding procedure, the data decoding procedure including instructions for:
establishing at least one list data structure for representing a list of blocks and at least one list of nodes;
providing a reconstructed data array for storing node data values, and partially decoded portions thereof;
initially storing in the list of nodes, one or more block identifiers, each block identifier in the list of blocks representing a single, rectangularly shaped, contiguous block of nodes in the data array; each block identifier in the list of blocks specifying a location in the data array associated with the block represented by the block identifier and also specifying the size value of the block represented by the block identifier; and
processing the encoded, compressed data in a same sequence in which it is stored therein so as to regenerate values in the data array, by:
reading a value from the encoded, compressed data that indicates the most significant non-zero bit, m, of a node having a largest absolute value in the data array; and
successively, for each bit plane X of the data array in a sequence of bit planes starting with X=m, reading data from the encoded, compressed data representing each such bit plane X, including:
for each block represented in the list of blocks, reading a single bit representing the Xth least significant bit of a node having a largest absolute value in the block;
when the single bit read for a block corresponds to a non-zero Xth least significant bit of a node in the block, if the block is larger than a predefined minimum size block, dividing the block into a plurality of subblocks and adding the subblocks to the list of blocks, and otherwise dividing the block into individual nodes and adding the nodes to the at least one list of nodes;
for each node represented in the list of blocks, reading a single bit representing the Xth least significant bit of the node's data value; and
when the single bit read for a node corresponds to the node's most significant non-zero bit, storing the read bit in the Xth least significant bit of a corresponding node of the reconstructed data array, reading a sign bit indicating whether the node's data value is positive or negative, and storing the sign bit in the corresponding node of the reconstructed data array if the sign bit is equal to a predefined value.

24. The computer program product of claim 23, the decoder procedure further including instructions for:
determining a most significant bit plane, StopPt, that is not to be decoded;
wherein the instructions for reading data for a sequence of bit planes X stop reading data with bit plane X=StopPt+1.

25. The computer program product of claim 23, the decoder procedure further including instructions for:
when dividing a block into individual nodes, for each of the individual nodes reading a single bit representing the Xth least significant bit of the node's data value when dividing a block into individual nodes, for each of the individual nodes reading a single bit representing the Xth least significant bit of the node's data value and storing that bit in the Xth least significant bit of a corresponding node of the reconstructed data array, and when the single bit read for a node corresponds to a non-zero Xth least significant bit, reading a sign bit indicating whether the node's data value is positive or negative and storing the sign bit in the corresponding node of the reconstructed data array if the sign bit is equal to a predefined value.

26. The computer program product of claim 25, wherein the number of nodes in each block, other than a block corresponding to all nodes in the data array, is equal to $2^{31\,N}$ times the number of nodes in a corresponding parent block, where N is an integer greater than zero.

27. The computer program product of claim 26, wherein the at least one list of nodes represents two node lists, including a small valued node list (LSN) and a large valued node list (LLN);
the decoder procedure including instructions for, when dividing a block into individual nodes, placing on the LLN each of the individual nodes whose Xth least significant bit is equal to 1 and placing each of the other individual nodes on the LSN.

28. The computer program product of claim 27, wherein the decoder procedure instructions for dividing a block into individual nodes includes instructions for marking the corresponding block identifier to indicate that the block identifier represents all the nodes in the corresponding block, listed in a predefined order; whereby the list of blocks in the at least one list data structure represents both a list of blocks and at least one list of nodes.

29. The computer program product of claim 28, wherein the marked block identifiers in the list of nodes indirectly represent two node lists, wherein a first node list comprises individual nodes corresponding to the marked block identifiers having an absolute value less than $2^x$, and a second node list comprises individual nodes corresponding to the marked block identifiers that are not included in the first node list.

30. The computer program product of claim 23, the computer program mechanism including instructions for:

executing the decoder procedure concurrently while the computer system executing the decoder procedure is receiving the encoded, compressed data over a communication channel; and at predefined junctures while the decoder procedure is being executed, invoking a procedure for generating a partially reconstructed image from the data stored so far in the reconstructed data array, thereby enabling a user to view the partially reconstructed image before all the encoded compressed data has been received and decoded.

* * * * *